United States Patent [19]

Takanashi et al.

[11] Patent Number: 5,226,029
[45] Date of Patent: Jul. 6, 1993

[54] ELECTRIC CHARGE IMAGE RECORDING MEDIUM AND RECORDING/REPRODUCING APPARATUS

[75] Inventors: Itsuo Takanashi, Kamakura; Takashi Yamamura, Yokohama; Toshikatsu Ichito, Kawasaki; Hiroki Kitamura, Setagaya; Hiromichi Tai, Yokosuka, all of Japan

[73] Assignee: Victor Company of Japan, Yokohama, Japan

[21] Appl. No.: 525,400

[22] Filed: May 16, 1990

[30] Foreign Application Priority Data

May 16, 1989 [JP] Japan .................. 1-122606
May 24, 1989 [JP] Japan .................. 1-131137
May 24, 1989 [JP] Japan .................. 1-131138

[51] Int. Cl.$^5$ .............................. H04N 5/30
[52] U.S. Cl. .................. 369/100; 358/213.11; 358/335; 358/310; 369/13; 369/14; 365/112
[58] Field of Search ............ 369/100, 13, 14; 358/906, 335, 213.11, 310; 365/112, 109, 110

[56] References Cited

U.S. PATENT DOCUMENTS

| | | | |
|---|---|---|---|
| 3,902,010 | 8/1975 | Goshima . | |
| 4,410,969 | 10/1983 | Maeda . | |
| 4,727,427 | 2/1988 | Kime . | |
| 4,937,810 | 6/1990 | Drexler | 369/275.1 |
| 4,956,714 | 9/1990 | Takanashi et al. | 358/213.11 |
| 5,003,402 | 3/1991 | Takanashi et al. | 358/310 |
| 5,006,935 | 4/1991 | Takanashi et al. | 358/310 |
| 5,038,166 | 8/1991 | Isaka et al. | 355/27 |
| 5,073,880 | 12/1991 | Maeda et al. | 369/32 |

FOREIGN PATENT DOCUMENTS

| | | |
|---|---|---|
| 341668 | 5/1989 | European Pat. Off. . |
| 63-7952 | 1/1988 | Japan . |
| 63-32312 | 3/1988 | Japan . |
| 63-113947 | 5/1988 | Japan . |
| 1-189047 | 7/1989 | Japan . |
| 1-284186 | 11/1989 | Japan . |

OTHER PUBLICATIONS

Patent Abstracts of Japan, vol. 12, No. 361 Sep. 23, 1988 & JP-A-63 112833.
Patent Abstracts of Japan, vol. 13, No. 478, Oct. 30, 1989 & JP-A-1 189045.
Patent Abstracts of Japan, vol. 14, No. 116, Mar. 5, 1990 & JP-A-1312754.
JP-A-6449146 & Patent Abstracts of Japan vol. 13, No. 250, Jun. 12, 1989.
Patent Abstracts of Japan, vol. 13, No. 478 Oct. 30, 1989 & JP-A-1 189046.

Primary Examiner—Tommy P. Chin
Assistant Examiner—Khoi Truong
Attorney, Agent, or Firm—Michael N. Meller

[57] ABSTRACT

An electric charge recording/reproducing apparatus for focusing an electromagnetic radiation ray containing a recording object information signal onto a photoconductive layer member (PCL) in an electric charge image recording medium (D) comprising a laminate of at least an electric charge retention layer, member (CHL), photoconductive layer member (PCL) and a first electrode (E) using an objective lens (318) which is driven and displaced in an optical axis direction by an actuator (ACT) of an automatic focusing system; and to integratedly connect and fix a moving electrode (Em) onto the objective lens (318), the moving electrode (Em) being intended to generate an electric field for positioning the electric charge image recording medium (D) in the electric field of a predetermined electric field intensity, towards the electrode in, the electric charge image recording medium (D). The electric charge image recording medium (D) composed of a laminate of at least a first electrode (E), a photoconductive layer member (PCL), an optical modulation layer member (PML) and an electric charge retention layer member (CHL), the electric charge recording medium comprising said electric charge retention layer member (CHL) provided with an electric charge image pattern for tracking control recorded and formed.

4 Claims, 17 Drawing Sheets

ELECTRIC CHARGE IMAGE RECORDING MEDIUM AND RECORDING/REPRODUCING APPARATUS

BACKGROUND OF THE INVENTION

The present invention relates to an electric charge image recording medium and a recording/reproducing apparatus.

FIG. 1 is a block diagram which shows an example of the composition of a recording/reproducing apparatus based on electric charge image. Referring to this FIG. 1, D represents an electric charge recording medium disk (hereinafter, described only as Medium D) comprising a laminar structure of a charge retention layer member IL and an electrode E. The electric charge retention layer member IL is composed of the material of such an extremely high insulation resistance that electric charges adhering on the member IL can be maintained for a long time (for example, a silicon resin). The charge retention layer member IL can also be comprised of any other configuration.

This Medium D is rotated at a predetermined revolution frequency by a rotary driving mechanism not illustrated. Referring to FIG. 1, WA represents a recording system configured so as to be capable to emit an electromagnetic radiation ray flux the intention of which is modulated by a recording object information signal (in the following description, the electromagnetic radiation ray flux is mentioned like a laser light flux while describing a source of generating electromagnetic radiation rays like a laser light source) from a lens 7. The recording system WA in the illustrated example comprises a laser light source 1, a lens 2, a polarizer 3, an optical modulator 4, a recording object information signal source 5, an analyzer 6 and a lens 7. Symbol RA in FIG. 1 is a reproducing system constructed in such a manner that an information signal recorded in the Medium D in the form of electric charges is read by a laser light flux and output as an electric signal. In the example shown in FIG. 1, the reproducing system comprises a laser light source 2, lenses 9, 12 and 15, a polarizer 10, a beam splitter 11, a wave plate 13, an analyzer 14, a photoelectric converter 16, an amplifier 17, an output terminal 18, etc.

A laser light flux emitted from the lens 7 of the recording system WA is transmitted through a transparent electrode Etw of a recording head WH comprising a laminar structure of the transparent electrode Etw and a photoconductive layer PCE, and applied to the photoconductive layer PCE. A voltage from a power source Vw across the transparent electrode Etw of the recording head WH and the electrode E of the Medium D. Therefore, when an intensity-modulated laser light flux enters the photoconductive layer PCE of the recording head WH according to an information signal sent from the recording system WA, the electric resistance at a portion of the photoconductive layer PCE to which the laser light flux was given decreases while activating to a charge retention layer member IL of the Medium D in the portion, thereby depositing electric charges on the surface of the charge retention layer member IL in the Medium D, according to the information signal. An image of electric charges created according to the information signal is regenerated as follows by the reproducing system. It is assumed that a detection head comprises a dielectric mirror DML, an optical modulation member layer PML, consisting of a single crystal of, for example, lithium niobate and a transparent electrode Etr. The optical modulation member layer PML changes the plane of polarization of light transmitted in the layer by an electric field created by the image of electric charges adhering on the surface of a charge retention layer member IL in the Medium D. Meanwhile, a laser light flux emitted from a lens 12 in the reproducing system RA is transmitted through the optical modulation member layer PML, reflected by the dielectric mirror DML and then entered in the lens 12 again. The plane of polarization of the light reflected above is changed according to the image of electric charges on the surface of the charge retention layer member in the Medium D.

The light entered again in the lens 12 in the above of which the plane of polarization has been changed according to the image of electric charges adhering on the surface of the charge retention layer member IL in the Medium D is supplied to an analyzer 14 via a beam splitter 11 and a wave plate 13. Thus, the analyzer 14 emits the light of a light quantity which changes according to the variation of the plane of polarization of the entered light. The output light is collected by a lens 15, given to a photoelectric converter 16 where it is converted to an electric signal. The output signal from the photoelectric converter 16 is amplified in an amplifier 17 thereby an output terminal 18 in the reproducing system issues the original information signal.

In the meantime, with the recording/reproducing apparatus based on the electric charge image, information stored in an electric charge image recording medium in a high recording density can be reproduced and recorded again easily using a simple device, by using the laser light of a satisfactorily small diameter. However, in order to reproduce a data recorded in a high recording density in terms of fidelity, it is necessary to drive and displace a reproducing element under a tracking control process. For this purpose, the applicant corporation of the present invention already proposed a reproducing device illustrated in FIG. 2.

FIG. 2 shows the block diagram of an already proposed electric charge image type reproducing device where a tracking control system applies to the reproducing element in a system of reproducing recorded image of electric charges. FIG. 3 is the block diagram of the tracking control system. Referring to FIG. 2, a Medium D comprises a laminar structure of a charge retention layer member IL and an electrode E, like with an already described Medium D. The Medium D is rotated by a rotary driving mechanism not illustrated, at a predetermined revolution frequency. The WA shown in FIG. 2 is configured in the same manner as the already described recording system WA referring to FIG. 1; namely it is a recording system comprising a laser light source 1, a lens 2, a polarizer 3, an optical modulator 4, a recording object information signal source 5, an analyzer 6 and a lens 7. The aspect of recording information by means of the recording system WA shown in FIG. 2 is the same as that already described referring to FIG. 1.

The RA in FIG. 2 is a reproducing system that reads information signal recorded in the Medium D in the image of electric charges, using a laser light while outputting as electric signals. Its partial configuration comprising a laser light source 2, lenses 9, 12 and 15, a polarizer 10, a beam splitter 11, a wave plate 13 and an analyzer 14 is the same as that of the reproducing system already described referring to FIG. 1. However, according to the aspect of the configuration shown in FIG. 2, the component parts of the photoelectric converter 16, amplifier 17 and the output terminal 18 in the reproducing system of FIG. 1 have been modified to a split type photodetector PD, tracking control circuit TSC, actuator ACT, etc. provided with photoelectric converter elements PDa–PDd.

Referring to FIG. 3, among output signals Sa–Sd from four photoelectric conversion elements PDa–PDd constituting the split type photodetector PD, output signals Sa and Sc from the elements PDa and PDc, respectively, are added by an adder 19 in the tracking control signal generating circuit TSC. In addition, among output signals Sa–Sd from four photoelectric conversion elements PDa–PDd constituting the split type photodetector PD, output signals Sb and Sd from the photoelectric conversion elements PDa–PDd, respectively, are added by an adder 20 in the tracking control signal generating circuit TSC.

Output signals (Sa+Sc) and (Sb+Sd) from the adders 19 and 20 respectively, are added by an adder 21 from which a reproduced signal of (Sa+Sb+Sc+Sd) is transmitted to an output terminal 18.

In addition, output signals (Sa+Sc) and (Sb+Sd) from the adders 19 and 20, respectively, are operated for {(Sa+Sc)−(Sb+Sd)} in a subtractor 22, while the phase of an output signal from the subtractor 22 being compensated in a phase compensation circuit PC thereby becoming a tracking control signal which is supplied to an actuator ACT from an output terminal 23. The actuator ACT drives and displaces the reproducing element in the direction orthogonal to the extension of a recorded track for the purpose of tracking control.

With the reproducing device based on the electric charge image, as already proposed and shown in FIG. 2, a tracking control signal is generated according to a reproduced signal obtained by reproducing an information signal recorded on the surface of the charge retention layer member IL of the Medium D as an image of electric charges, and supplied to the actuator. The actuator drives and displaces the reproducing element in the direction orthogonal to the extension of a recorded track. However, there is also another proposal of generating tracking control information according to the change of the geometrical shape of the charge recording medium in order to have more preferable tracking control processing.

PROBLEMS TO BE SOLVED BY THE INVENTION

FIG. 4 relates to such a Medium D comprising a charge retention layer member IL and an electrode E in a laminar structure, where the charge retention layer member IL and the electrode E are constructed in a concave and convex shape as being able to function in the same way as a tracking control groove constructed on the surface of a substrate in a so-called pregrooved optical disk. More particularly, FIG. 4 shows the state in which the surface of the photoconductive layer PCE of the recording head WH is arranged in the vicinity of the surface of the charge retention layer member IL. FIG. 5 shows an enlarged view of the electric charge recording medium D shown in the portion of a round mark Z in FIG. where the charge retention layer member IL and the electrode E in the Medium D are configured in such a concave and convex shape as being capable to function in the same way as a groove for tracking control provided on the surface of the substrate in a so-called pregrooved optical disk. Tp in FIG. 5 represents an interval between recording tracks (track pitch).

Referring to FIGS. 4 and 5, the relationship between the track pitch Tp of the Medium D and the width W of the recording head WH (the width W of the recording head WH relates to the lateral direction of the recording track in the electric charge recording medium) is represented typically by such dimensions as 1.6 μM and 6 mm for the track pitch Tp and the width W of the recording head WH, respectively. In general, there is a relationship of W >Tp.

Now it is assumed that the Medium D is revolving at a frequency of 1800 revolutions per minute while the recording position moves to the adjacent recording track by a track every revolution of the Medium D. It is also assumed that the recording pitch Tp of the Medium D is, for example, 1.6 μM with a width W of the recording head WH (the width W of the recording head WH in the lateral direction of the recording track in the charge recording medium) of 6 mm for example.

Still another assumption is that the recording head WH is moving by 1.6 μM each every time the Medium D revolves one turn in the radial direction of the Medium D. Then, it takes about 2 minutes for the recording head WH to move outside the range of the charge recording medium, to which range the leading end of the recording head WH in the moving direction corresponded upon starting for record.

On the other hand, a voltage from a power source Vw is applied across the transparent electrode Etw of the recording head WH arranged opposing to a recording portion in the Medium D and the electrode E of the Medium D during each recording operation. Therefore, when a laser light flux the intensity of which is modulated by an information signal as already described enters the photoconductive layer PCE of the recording head WH, the electric resistance in the portion with the laser light flux given in the photoconductive layer PCE decreases so much as electric discharging occurs between the portion and the charge retention layer member IL of the Medium D. Thereby, electric charges adhere on the surface of the charge retention layer member IL in the Medium D in a quantity corresponding to the information signal. However, because the voltage from the power source Vw is always applied across the entire surface of the transparent electrode Etw in the recording head WH and the Medium D, a dark current flows for a long time in the photoconductive layer PCE of the recording head WH as described before also for the portion of the Medium D, other than the portion of receiving the laser light flux in the photoconductive layer PCE of the recording head. Thereby, the dark current creates an image of electric charges while building up potentials in entirety resulting in the deterioration of S/N ratio of recorded data, as a problem.

FIG. 6 is the block diagram of the already proposed reproducing device using the image of electric charges, based on the tracking control system applied to the reproducing element in the reproducing device of recorded electric charge image. The tracking control system is shown in FIG. 3. Referring to FIG. 6, the Medium D comprises a laminar structure of an insulation layer IL and an electrode E, while the Medium D being rotated by a rotary driving mechanism although not illustrated at a predetermined revolution frequency.

The WA in FIG. 6 is a recording system comprising a laser light source 1, a lens 2, a polarizer 3, an optical modulator 4, a recording object information signal source 5, an analyzer 6 and a lens 7. The RA of FIG. 6 is such a reproducing system that an information signal recorded in the form of the electric charge image in the Medium D is read by a laser light while outputting as an electric signal.

A laser light flux emitted from the lens 7 in the recording system WA is transmitted through the transparent electrode Etw of the recording head WH comprising a laminar structure of the transparent electrode Etw and the photoconductive layer PCE and given to the photoconductive layer PCE. A voltage from the power source Vw is applied across the transparent electrode Etw of the recording head WH and the electrode E of the Medium D. Therefore, when a laser light flux the intensity of which is modulated by an information signal enters the photoconductive layer PCE of the recording head WH from the recording system WA as described before, the electric resistance in a portion of receiving the laser light flux in the photoconductive layer PCE decreases so much as a discharge takes place between that portion and the insulation layer IL of the Medium D. Thereby, electric charges adhere on the surface of the insulation layer IL of the Medium D in a quantity corresponding to the information signal, thus a recording object information signal being recorded as an image of electric charge.

The image of electric charges corresponding to the recording object information signal described above is reproduced as follows by the reproducing system. It is assumed that a detection head comprises a dielectric mirror DML, an optical modulation member layer PML composed of such a material as the single crystal of lithium niobate and a transparent electrode ETR. At that time, the optical modulation member layer PML in the detection head changes the plane of polarization of a light transmitted therein by an electric field generated by the image of the electric charges adhering on the surface of the insulation layer IL of the Medium D. Therefore, when a laser light flux emitted from the lens of the reproducing system RA is transmitted through the optical modulation member layer PML, then reflected at the dielectric mirror DML and enters the lens 12 again, the plane of polarization of the entering light has been already changed corresponding to the image of electric charges adhering on the surface of the insulation layer IL of the Medium D. The plane of polarization of the light entering the lens 12 as described above has been already altered according to the image of electric charges adhering on the surface of insulation layer IL of the Medium D. Since the light is supplied to an analyzer 14 via a beam splitter 11 and a wave plate 13, the analyzer 14 emits the light in such a quantity as changing according to the variation of the plane of polarization of the light entering the detector 14, which is supplied to a split type photodetector PD having photoelectric conversion elements PDa-PDd after being collected by the lens 15.

Referring to FIG. 3, among output signals Sa-Sd from four photoelectric conversion elements constituting the split type photodetector PD, the output signals Sa and Sc from photoelectric conversion elements PDa and PDc, respectively, are added by the adder 19 in the tracking control signal generating circuit TSC. In addition, among output signals Sa-Sd from four photoelectric conversion elements PDa-PDd constituting the split type photodetector PD, the output signals Sb and Sd from the photoelectric conversion elements PDb and PDd are added by the adder 20 in the tracking control signal generating circuit TSC.

Output signals (Sa+Sc) and (Sb+Sd) from the adders 19 and 20, respectively, are added by the adder 21 which transmits a reproducing signal (Sa+Sb+Sc+Sd) to the output terminal 18.

In addition, output signals (Sa+Sc) and (Sb+Sd) from the adders 19 and 20, respectively, are operated for the subtraction of {(Sa+Sc)−(Sb+Sd)} by the subtractor 22, the output signal from which is phase compensated in the phase compensation circuit PC becoming a tracking control signal which being supplied from the output terminal 23 to the actuator ACT. The actuator ACT drives and displaces the reproducing element in the direction orthogonal to the extension of a recording track for tracking control.

With the reproducing device based on the image of electric charges, already proposed as shown in FIG. 6, information signal recorded as the image of electric charges on the surface of the insulation layer IL of the Medium Dm is regenerated to have a reproduced signal based on which a tracking control signal is generated and supplied to the actuator. The actuator drives and displaced the reproducing element in the direction orthogonal to the extension of a recording track for activating tracking control. However, there is another proposal of making tracking control processing more satisfactory by incorporating such a system as information for tracking control can be generated according to the variation of the geometrical shape of the electric charge image recording medium.

PROBLEMS TO BE SOLVED BY THE INVENTION

Meanwhile, with the electric charge image recording/reproducing apparatus as already proposed, the electric charge image recording medium used upon recording electric charge image does not store information for tracking control. Therefore, in order to record information in a high recording density into the electric charge recording medium, the mechanical accuracy of a feeding mechanism in the recording system is required to be extremely high. Consequently, the composition of the recording/reproducing apparatus has been correspondingly complicated.

In order that information can be recorded in the electric charge recording medium at a high recording density without using a feeding mechanism of a very high mechanical accuracy in the recording system, it is already known in the prior art that grooves 4 for tracking control are composed beforehand in the recording medium D as shown in FIG. 7 as an example. FIG. 8 shows the state of a recording operation of the grooves for tracking control shown in FIG. 7, in which a laser light is irradiated (the white round mark in the figure represents a light spot of the laser light) for tracking control.

However, in order to manufacture and practically use such a recording medium as being provided with mechanically constructed grooves for tracking control, a large-scale manufacturing facility is required for producing the recording medium of such a configuration.

PROBLEMS TO BE SOLVED BY THE INVENTION

In the meantime, when a recording object information signal is to be recorded in an electric charge image recording medium under tracking control operation, a laser light flux incorporating the recording object information signal is irradiated onto the electric charge image recording medium while also reading tracking control information and focus control information previously stored in the recording medium. However, when such a system as each of the operations is activated by a laser light flux, the configuration of the detection system becomes complicated in excess as a practical problem. To prevent it, there is also another proposal that a plurality of laser light fluxes is used to activate operations of recording, reproducing and detection of servo signal, as known in the prior art. However, when any of conventional proposals (for example, Japanese Utility Model Laid-open Publication No. 7952/1988, Japanese Patent Laid-open Publication No. 833/1988 and Japanese Utility Model Laid-open Publication No. 32312/1988), it is not possible to record information signals in a multi-value recording mode in which data can be recorded in a high recording density, on a recording plane. Consequently, the development of such a recording/reproducing apparatus as capable to record and reproduce data in a ultra-high density using a recording plane. FIG. 16 is a block diagram showing an example configuration of the, already proposed electric charge image recording/reproducing apparatus. With the already proposed electric charge recording/reproducing apparatus shown in FIG. 16, D represents an electric charge recording medium disk (hereinafter referred to only as Medium D). The Medium D shown in FIG. 16 and practically used at present comprises, for example like the Medium D shown in FIG. 15, such a structure as a substrate BP laminated with a charge retention layer member CHL composed of such a material as having extremely high insulation resistance (for example, silicone resin) to maintain electric charges adhering thereon for a long time, an optical modulation member layer PML (a layer consisting for example of the single crystal of lithium niobate or liquid crystal), a photoconductive layer member PCL and an electrode E.

The Medium D shown in FIG. 16 is rotated at a predetermined revolution frequency by a rotary driving mechanism not illustrated. PH shown in FIG. 16 represents an optical head which is constructed in such a manner that the head is moved in the radial direction of the Medium D by a carriage 1 (the detailed configuration of which is not illustrated).

In the optical head PH shown in FIG. 16, a semiconductor laser 102 emits a laser light the intensity of which is modulated by a recording object information signal when the electric charge i ma ge recording/reproducing apparatus is set to a recording mode, and gives the light to a collimator lens 103. When the electric charge recording/reproducing apparatus is set to a reproducing mode, the semiconductor laser 102 emits a laser light of a predetermined intensity and gives it to the collimator lens 103.

Referring to FIG. 16, numerals represent various devices as follows; beam splitters 104–106, objective lens (condenser lens) 107, ranges 108–110, cylindrical lens 111, photoelectric converters 112 114 and transparent electrode 115. The objective lens 107 is composed in such a manner that it is driven and displaced in the optical axis direction of the objective lens by an actuator ACT in the automatic focus control system in the optical head PH. In addition, the transparent electrode 115 is fixed on the carriage 101 so that there is a gap to the surface of the Medium D. The semiconductor laser 102 emits a laser light flux when the electric charge image recording/reproducing apparatus is set to a recording mode. The emitted laser light flux is modulated in its intensity by a recording object information signal while being modified to a parallel light by the collimator lens 103. Then, the parallel light is focused on the photoconductive layer member PCL in the Medium D by means of an optical path of the beam splitter 104→objective lens 107 transparent electrode 115→Medium D.

A voltage is applied across the transparent electrode 115 and the electrode of the Medium D (as shown by a symbol E of FIG. 15) from a power source Vw. Therefore, when a laser light flux of which the intensity is modulated by a recording object information signal is irradiated onto the photoconductive layer PCL, the electric resistance in a portion to which the laser light flux is given in the photoconductive layer PCL decreases so as to causing discharge at that portion towards the charge retention layer member CHL of the Medium D, thereby electric charges adhere on the surface of the charge retention layer member CHL in the Medium D in a quantity corresponding to the recording object information signal.

An image of the electric charges created as described above on the charge retention layer member CHL of the Medium D can be regenerated as follows. An optical modulation member layer PML is composed of such a material as for example the crystal of lithium niobate on the Medium D, and modulates the plane of polarization of a light passing therein by the electric field of the image of electric charges adhering on the surface of the charge retention layer member CHL in the Medium D. Consequently, when the electric charge image recording/reproducing apparatus is in a reproducing mode, the semiconductor laser 102 emits a laser light flux of a predetermined optical intensity. The laser light flux is given to the objective lens 107 via the collimator lens 103 and the beam splitter 104 and then emitted from the objective lens 107. The laser light flux reciprocally passes the optical modulation member layer PML of the Medium D and then enters the objective lens 106 as a light reflected from the Medium D. The plane of polarization of the reflected light has been changed corresponding to the image of electric charges created on the surface of the charge retention layer member CHL of the Medium D. The light reflected from the Medium D is reflected at the beam splitter 104 and then modified by an analyzer AL to a light in such a state that the intensity of the light has been changed. The light is then given to the beam splitter 105, while a component of the light transmitted through the beam splitter 105 is applied to a four-split photoelectric converter 112 via a lens 108 and a cylindrical lens 111. An output signal from the four-split photoelectric converter 112 is used as a control signal for an automatic focus control system based on an astigmatism already known in the prior art. In addition, the other component of the light is reflected in the beam splitter 105 and given to the beam splitter 106. A part of this light is transmitted through the beam splitter 106 and then supplied to the photoelectric converter 114 via the lens 110, in which the light is photoelectrically converted to an output signal therefrom. The other component of the light, reflected in the beam splitter 6 after being reflected in the beam splitter 105, is given to the photoelectric converter 113 via the lens 109, where the light is photoelectrically converted and output from the converter 113. These outputs from the converters 113 and 114 are supplied to a differential circuit, although illustrated, in which the outputs are used as detection signals of high S/N.

PROBLEMS TO BE SOLVED BY THE INVENTION

The recording/reproducing apparatus can record and produce signals in a high recording density using a laser light of a satisfactorily small diameter while incorporating a simple device. However, if a spacing between the electrode E and the transparent electrode 115 in the Medium D largely changes upon writing an information signal, it sometimes occurs that the information signal is not correctly recorded in the Medium D. Particularly when information signals are to be recorded in the mode of multi-value recording into the Medium D aiming at a higher information density for recording and reproducing, multi-value recording will not be correctly completed if the spacing changes even slightly. Consequently, it is required that the position of the transparent electrode 115 is adjusted correctly for each electric charge image recording medium of different thickness. However, it is very difficult to finely adjust the position of the transparent electrode 115 because the adjustment is to be performed for the recording/reproducing apparatus. In addition, if the spacing between the transparent electrode 115 and the electrode of the Medium D fluctuates by, for example, a surface deflection of the Medium D, recorded details may become erroneous. Most explicitly, with the already proposed electric charge image recording/reproducing apparatus, the distribution of electric charges in relation to the image recorded in the charge retention layer member CHL of the Medium D is determined according to the degree of intensity modulation by the laser light irradiated onto the Medium D as long as a predetermined voltage Vw is applied across both the electrodes E, 115 from a power source Vw.

However, if the spacing between the electrodes E and 115 of the Medium D is fluctuating while a predetermined voltage Vw is applied across both the electrodes E and 115 from the power source Vw, the distribution of electric charges contributing to the charge image recorded and formed on the charge retention layer member CHL of the Medium D no longer corresponds to the intensity modulation of the laser light incident to the Medium D.

The problem described above will not be a significant trouble when information signals are recorded in the format of binary recording into the Medium D. However, the problem becomes much more troublesome when information signals are recorded in multi-value recording into the Medium D.

In this point of view, a system shown in FIG. 17 was proposed and tried with the electric charge recording/reproducing apparatus shown in FIG. 16; a floating electrode FE configured in the same manner as a so-called Winchester type floating magnetic head shown in FIG. 5 was levitated to maintain the spacing between the electrode E and floating electrode FE (corresponding to the transparent electrode 115 in FIG. 16) of the Medium D, on the surface of the Medium D revolving at a high speed. However, this solution of using a floating type electrode FE cannot be adopted because, in order to maintain the floating electrode FE floated at a predetermined distance above the Medium D, the Medium D must be revolved at a high speed according to the constant linear velocity system (CLV) and that the distance of floatation available for the floating type electrode FE is only about 12 μm.

As a means to suppress the spacing between the transparent electrode 115 and the electrode of the Medium D not to fluctuate even when the surface of the Medium D may swing for example, the system described in the Japanese Patent Application No. 13252/198 has been already proposed; in which the position of a transparent electrode in relation to the electric charge image recording medium is detected by the change of a static capacitance value while automatically controlling the position of the transparent electrode using detected values. However, this proposal has a difficult problem that a complicated configuration of various devices is required to apply the system practically.

SUMMARY OF THE INVENTION

According to the present invention, there are provided; an electric charge recording/reproducing apparatus comprising:

a first means to focus an electromagnetic radiation ray containing a recording object information signal onto a photoconductive layer member (PCE) in an electric charge image recording medium (D) comprising a laminate of at least an electric charge retention layer member (CHL), the photoconductive layer member (PCE) and a first electrode (E) using an objective lens (107) which is driven and displaced in an optical axis direction by an actuator (ACT) of an automatic focusing system; and a second means to integratedly connect and fix a moving electrode (Em) onto the objective lens (107), the moving electrode (Em) electrode being intended to generate an electric field for positioning the electric charge image recording medium (D) in the electric field of a predetermined electric field intensity, towards the electrode in the electric charge image recording medium (D), and an electric charge image recording medium (D) composed of a laminate of at least a first electrode (E), a photoconductive layer member (PCE), an optical modulation layer member (PML) and an electric charge retention layer member (CHL), the electric charge recording medium comprising the electric charge retention layer member (CHL) provided with an electric charge image pattern for tracking control recorded and formed.

DESCRIPTION OF THE PREFERRED EMBODIMENTS

Figure 9:
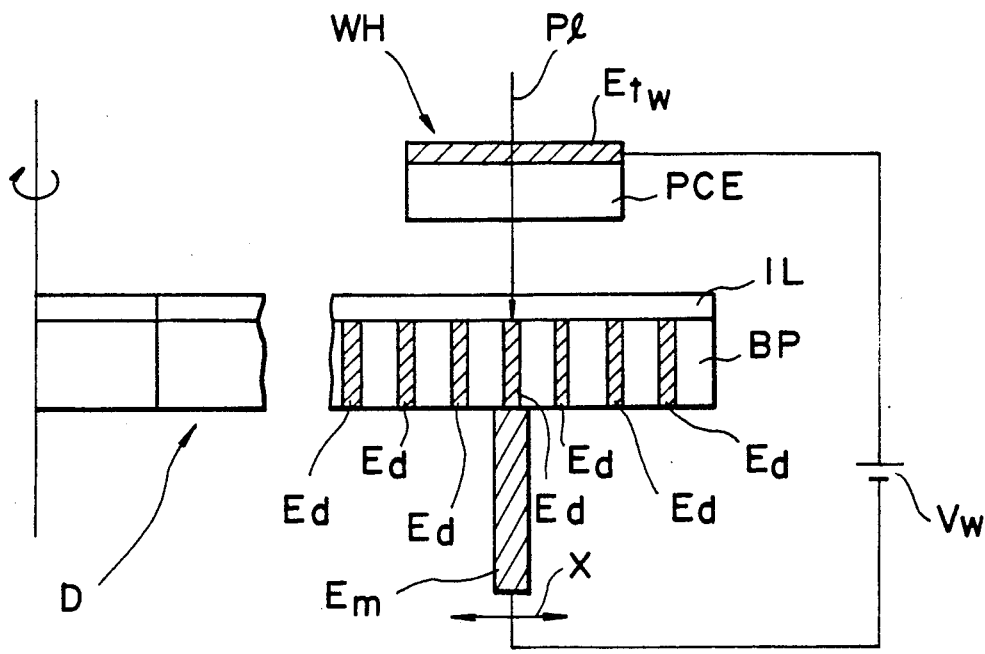
FIG. 9 shows a side elevation of a major composition of a recording/reproducing apparatus using an electric charge image recording medium according to the present invention.
Figure 10:
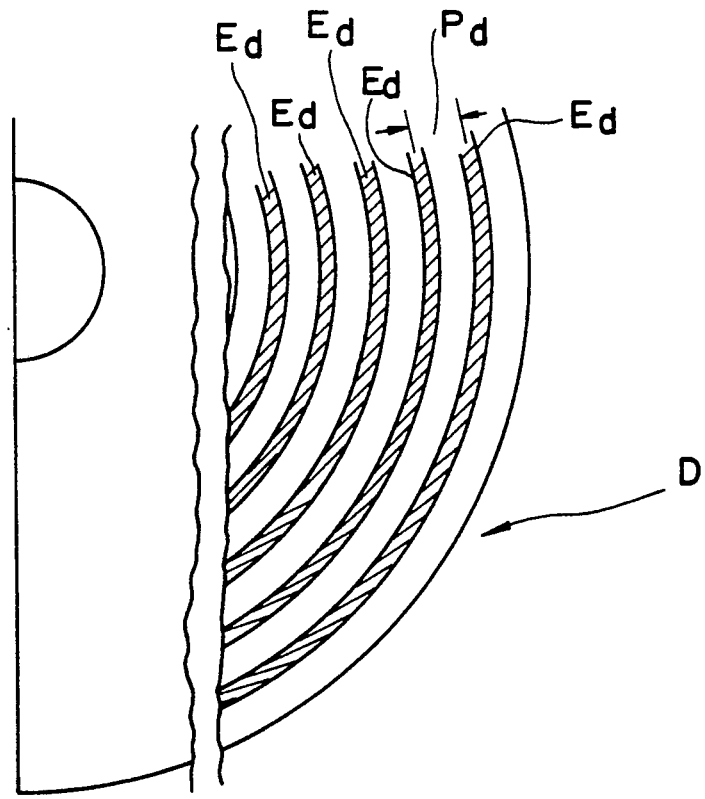
FIG. 10 is a plan view of a principal part of the same recording medium.

In FIGS. 9 through 13, D represents the electric charge image recording medium according to the present invention. The electric charge image recording medium D shown in FIGS. 9 and 10 is an example in which the electric charge image recording medium D of the present invention is embodied as a disk-like electric charge image recording medium. The electric charge recording medium D shown in FIGS. 11 through 13 relates to an example that the electric charge recording medium D of the present invention is embodied as a card-like electric charge image recording medium.

The electric charge image recording medium D shown in FIGS. 9 and 10 relates to such an electric charge image recording medium comprising such electrodes Ed, Ed, Ed—as individually corresponding to sequential recording tracks to be recorded and formed onto the electric charge image recording medium with separating guard bands of predetermined widths as the electrode in the disk-like electric charge image recording medium comprising a laminate of an electric charge retention layer member IL and the electrode. Pd in FIG. 10 is pitch of the electrode Ed. When the electric charge image recording medium D is embodied as a disk-type for example, recording tracks to be recorded and formed sequentially on the electric charge image recording medium D may be composed for example of a concentric or vortex type. Therefore, the electrodes Ed, Ed, —, as composed by separating each other with a predetermined guard band in a pitch of Pd in correspondence to sequential recording tracks of a circular electric charge image recording medium D, are also formed in a concentric or vortex type corresponding to the shape of recording tracks in a concentric or vortex shape.

At that time, the electrodes Ed, Ed, —provided in correspondence to sequential recording tracks in the disk-like electric charge image recording medium D in Pd pitches while being separated by predetermined guard bands, are configured on an insulation board BP in the electric charge image recording medium D in such a state as each electrode Ed is electrically isolated from adjacent electrodes. Since the electric charge image recording medium D of the present invention is composed by laminating an electric charge retention layer member, IL and an electrode, the electric charge retention layer member IL may comprise such a material as capable to retain electric charges for a long time, thanks to an extremely high insulation resistance (for example, a silicone resin). Besides, such an electric charge retention member material IL, there are many electric charge retention layer members IL such as those of (1) a laminate of a conductive layer member and a dielectric layer member, (2) a laminate of an electric charge mobility suppression layer member (for example, thin layer of silicon dioxide or a thin layer of aluminium is used), a dielectric layer member and a photoconductive layer member, (3) a laminate of an electric charge mobility suppression layer member (for example, a thin layer of silicon dioxide or a thin layer of aluminium is used), a laminar structure comprising a dielectric layer member and fine grains of a photoconductive substance and a photoconductive layer member, and (4) a laminate of a dielectric layer member, an optical modulation material layer member and a photoconductive layer member. Referring to FIG. 9, a disk-like electric charge image recording medium D is made rotating by a rotary driving device not illustrated therein. A moving electrode Em is made moving in the direction of the arrow X in the figure (radial direction of the disk-like electric charge image recording medium D) and contacting with the end of each electrode Ed, Ed composed in the insulation board BP in the electric charge image recording medium D. Between the moving electrode Em and a transparent electrode Etw in a recording head WH, a power source Vw is connected. The moving electrode Em, in contact sequentially with the end portions of electrodes Ed, Ed—constructed in the insulation board BP of the electric charge image recording medium D, is moved in such a state as it is electrically connected to an electrode Ed corresponding to a recording track where a recording process is being operated by an electromagnetic radiation ray flux (laser light flux) Pl containing a recording object information signal incident to the recording head WH in a recording operation.

Therefore, with the recording/reproducing apparatus shown in FIG. 9, the moving electrode EM is moved sequentially to next recording track every time the electric charge image recording medium D revolves 1 turn, in correspondence to a recording track where a recording process is being operated by an electromagnetic radiation ray flux (laser light flux) P1 containing a recording object information signal incident to the recording head WH. Thus, a discharge corresponding to the electromagnetic radiation ray flux (laser light flux) P1 containing the recording object information signal is made to take place only to the recording track where a recording operation is going on by the electromagnetic radiation ray flux (laser light flux) P1 containing the recording object information signal, by an electric field created by the power source Vw connected across the transparent electrode Etw in the recording head WH irradiated with the electromagnetic radiation ray flux (laser light flux) P1 containing the recording object information signal, and an electrode Ed among others in the electric charge image recording medium D.

Figure 11:
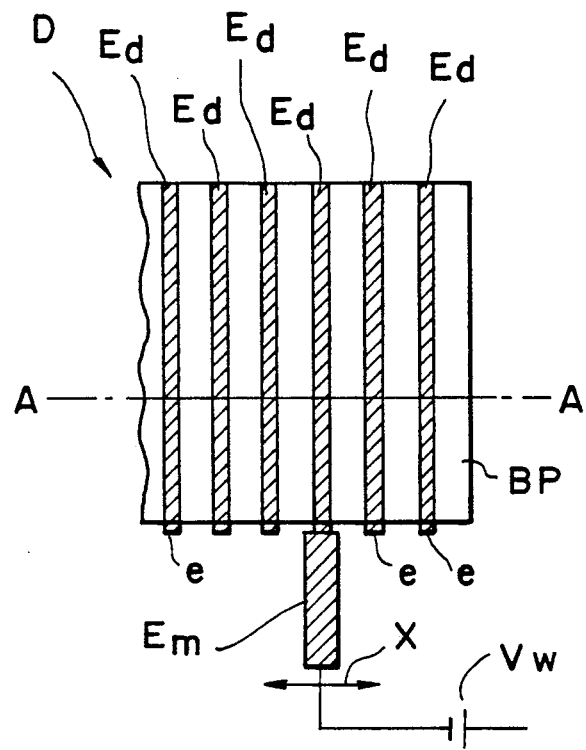
FIG. 11 is a plan view for showing an important composition of a recording/reproducing apparatus using the electric charge image recording medium based on the present invention.
Figure 12:
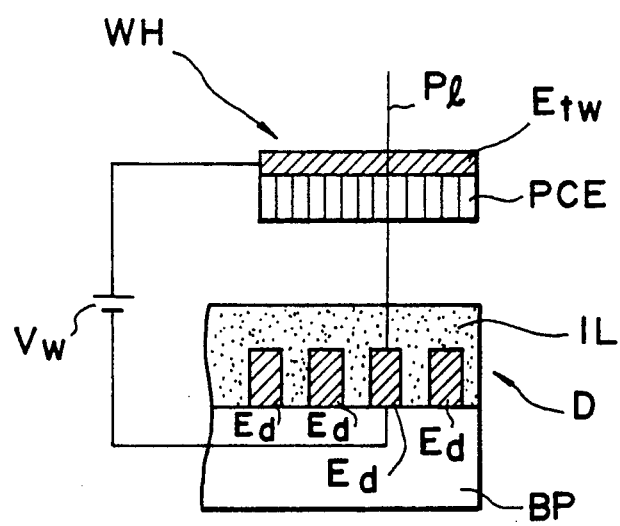
FIGS. 12 and 13 are side views to show major compositions of a recording/reproducing apparatus using the electric charge image recording medium of the present invention.
Figure 13:
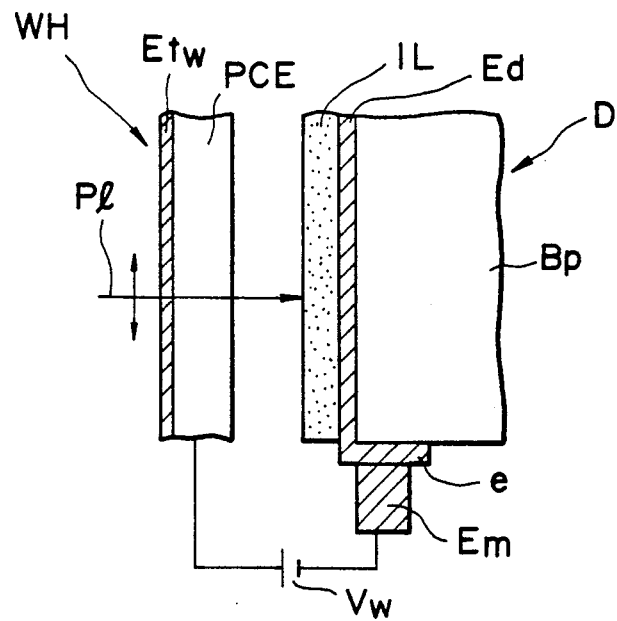

Next, referring to FIGS. 11 through 13, an embodiment of the present invention in a card-like (rectangular shape) electric charge image recording medium D is described.

In FIGS. 11 through 13, BP represents an insulation board in the electric charge image recording medium D, on which electrodes Ed, Ed—are provided in translation at predetermined pitch Pd as shown by the example of FIG. 11. In FIG. 11, the layout pattern of many electrodes Ed, Ed—configured on the surface of the insulation board BP in the electric charge image recording medium D is clearly indicated by omitting to illustrate an electric charge retention layer member IL provided on the upper surface of the insulation board BP and many electrodes Ed, Ed—. In addition, it is also omitted to indicate a recording head WH which is shown in FIGS. 12 and 13. Symbols e, e—shown in FIG. 11 represent bent portions at the ends of electrodes Ed, Ed—. The moving electrode Em is provided to be movable in contact with these bent portions e.

FIG. 12 is a view showing a side elevation at the A—A section in FIG. 11, in which the illustration is simplified by describing the view as if an end of the power source Vw is connected to an electrode Ed.

Also with the card-like electric charge image recording medium D as shown in FIGS. 11 through 13 as an example, it is needless to say that the electric charge retention layer member IL can be replaced with the same of a freely selected configuration as already described.

Operations of recording and reproducing an information signal onto/from the card-like electric charge image recording medium D shown in FIGS. 11 through 13 takes place as follows. An electromagnetic radiation ray flux (laser light flux) P1 is moved in the direction of the arrow shown in FIG. 13 while performing a recording operation or reproducing operation from one end to the other end of a recording track. Then, the electromagnetic radiation ray flux (laser light flux) P1 is moved in the direction of the arrow X shown in FIG. 11 by a recording track interval while activating a recording operation or reproducing operation to the next one recording track. In synchronization with the moving of the electromagnetic radiation ray flux (laser light flux) P1 in the direction of the arrow of FIG. 11 by a recording track interval, the moving electrode Em is also moved. The moving electrode Em, coming in contact with the ends of electrodes Ed, Ed—constructed in the insulation board BP in the electric charge image recording medium D, is moved in such a state that it is electrically connected to an electrode Ed corresponding to a recording track where a recording process is being operated by an electromagnetic radiation flux (laser light flux) P1 containing a recording object information signal incident to the recording head WH during a recording mode.

Therefore, also with the recording/reproducing apparatus the example of which is shown in FIGS. 11 through 13, operating principles are the same as those of the apparatus already described referring to FIG. 9. As illustrated in FIGS. 9 and 11, the moving electrode Em is moved sequentially to recording tracks in correspondence with a recording track at which a recording process is operated by the electromagnetic radiation ray flux (laser light flux) P1 containing a recording object information signal incident to the recording head WH. In the meantime, the power source Vw supplies an electric field between the transparent electrode Etw in the recording head WH in which the electromagnetic radiation ray flux (laser light flux) P1 containing the recording object information signal enters and an electrode Ed with which the moving electrode Em is in contact among other electrodes Ed in the electric charge image recording medium D. Thus, a discharge takes place only at the recording track where a recording process is operated by the electromagnetic radiation ray flux (laser light flux) P1 containing the recording object information signal by this electric field in correspondence to the electromagnetic radiation ray flux (laser light flux) P1 containing the recording object information signal.

Figure 1:
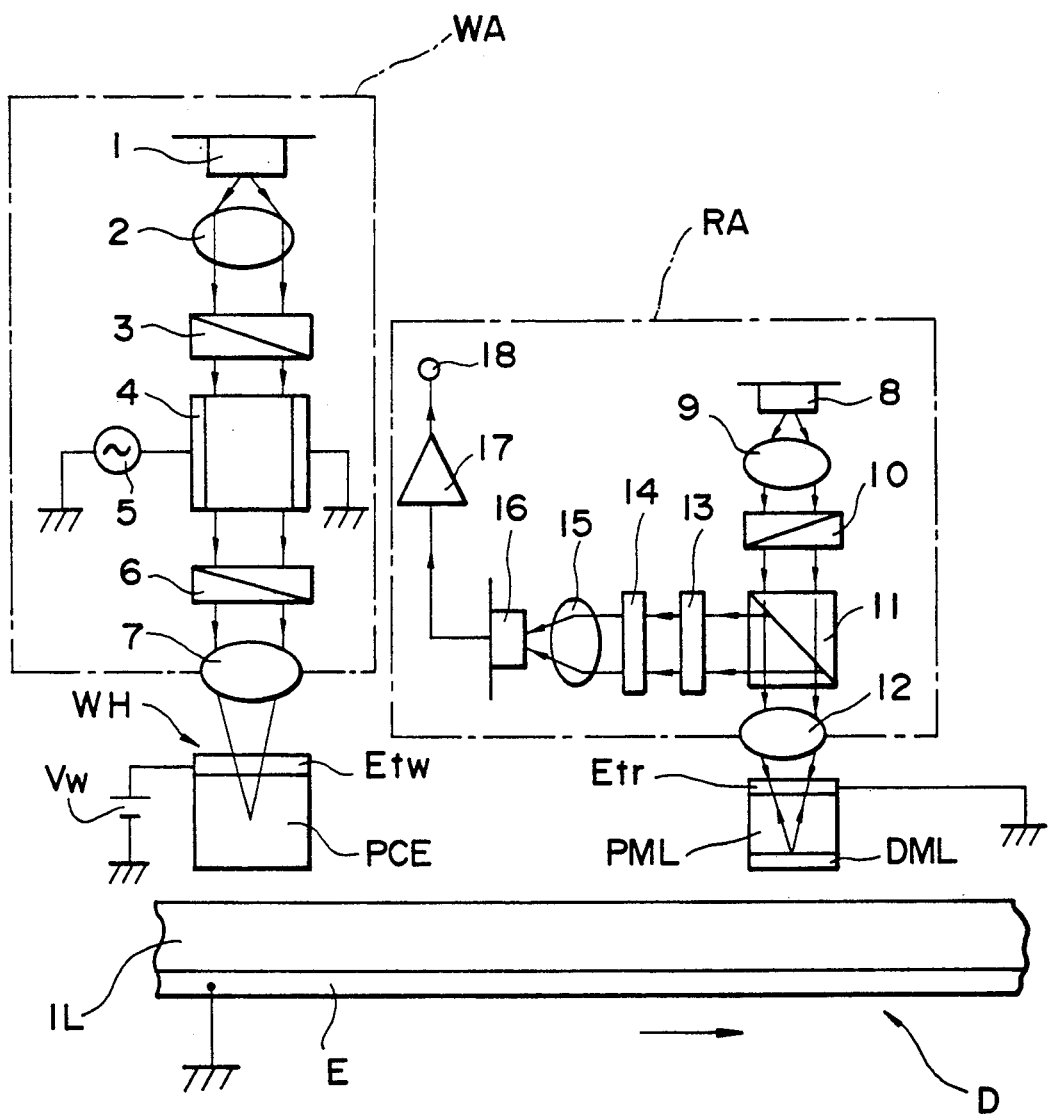
FIGS. 1 through 3 are side elevations to show important configurations of a conventional recording/reproducing apparatus.

In addition, the problem that it is not easy to make each electrode Ed having microscopic dimensions at any time with the moving electrode Em can be advantageously solved by applying the resolution measures already described referring to FIG. 1, namely by using the moving electrode Em of such a size as satisfying the following Equation (A).

$$L < Pd.N.T \tag{A}$$

Figure 2:
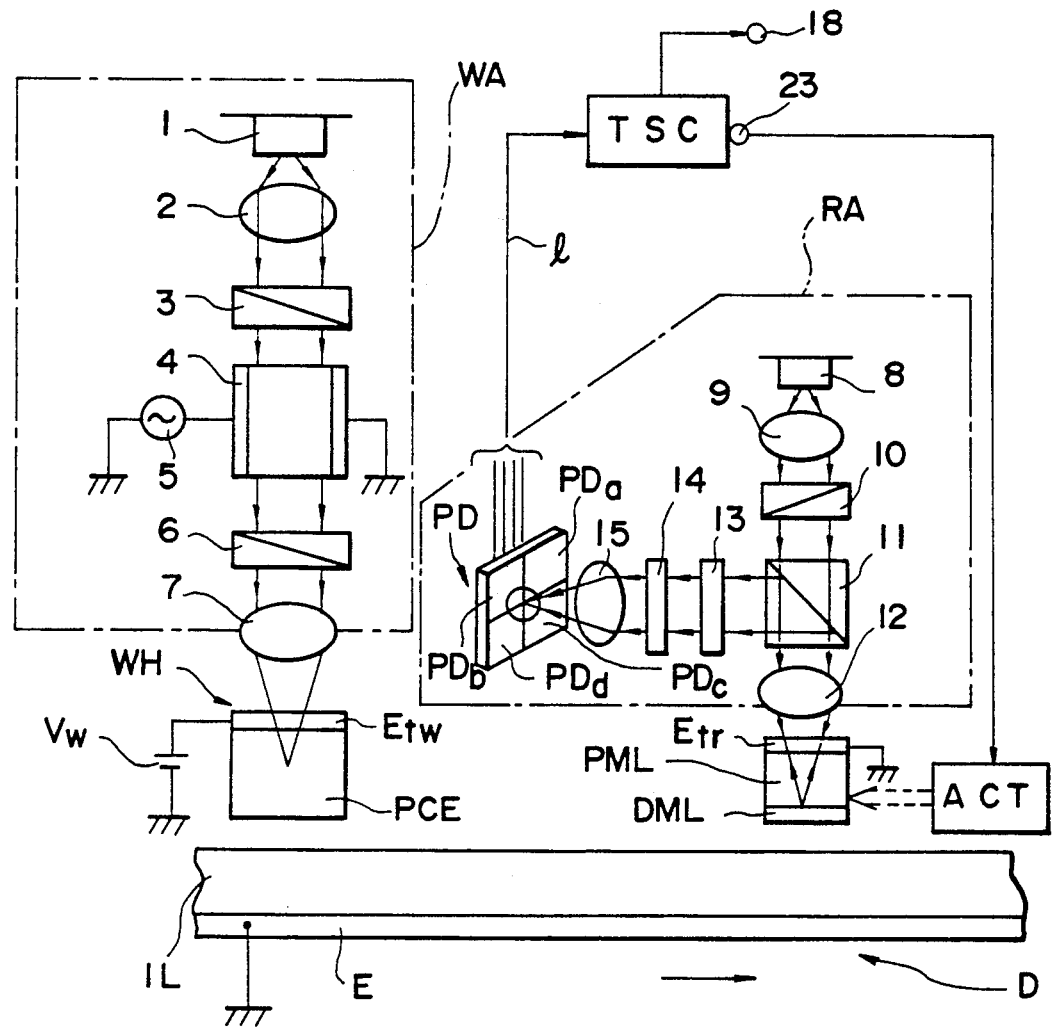
Figure 3:
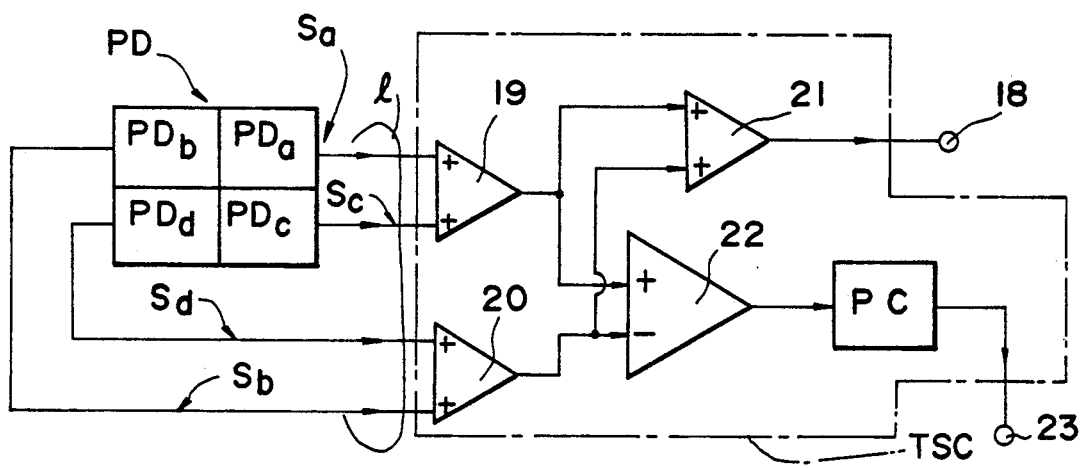
Figure 4:
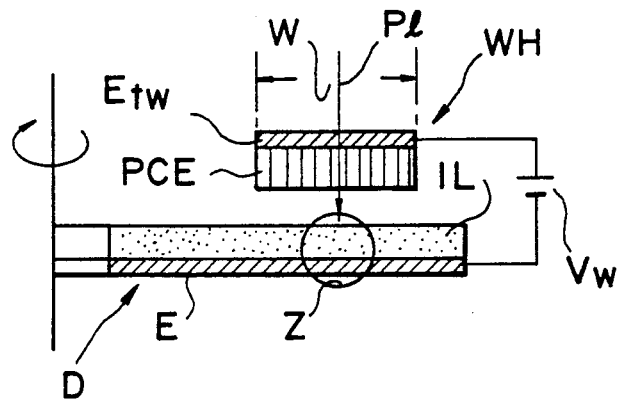
FIGS. 4 and 5 are side views for describing problems of a conventional device.
Figure 5:
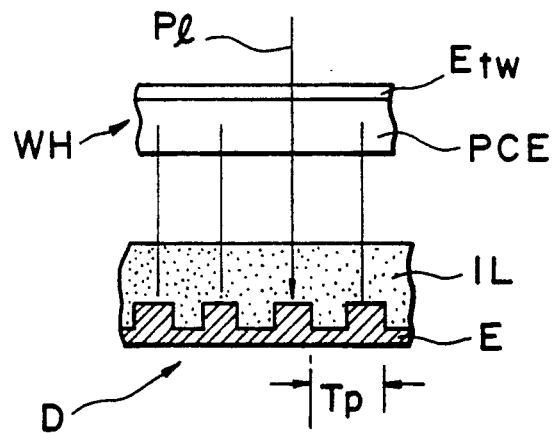
Figure 6:
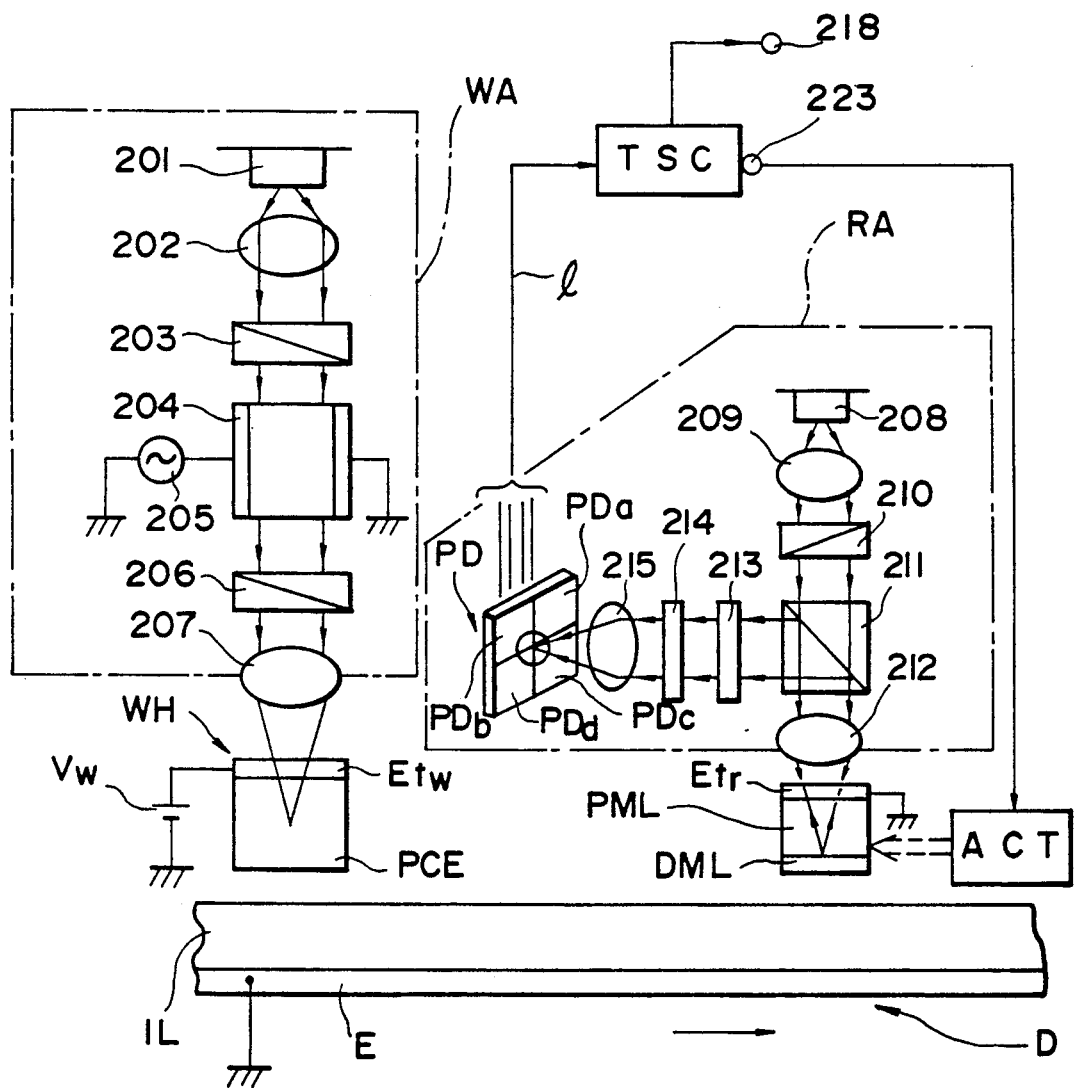
FIG. 6 is a block diagram to denote a device on which the apparatus of the present invention is based.
Figure 7:
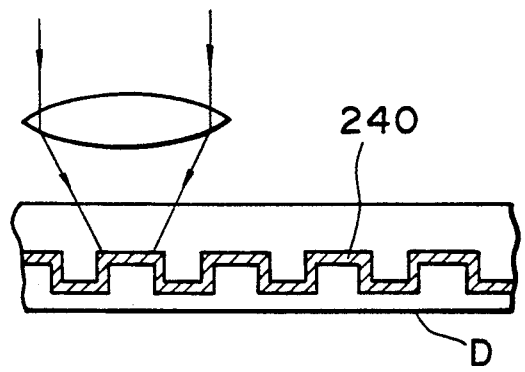
FIG. 7 is a side elevation to indicate a conventional optical disk.
Figure 8:
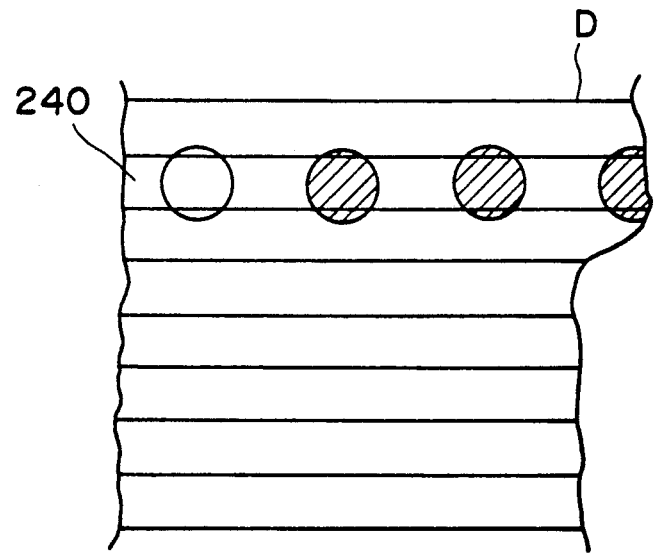
FIG. 8 is a plan view of the same conventional optical disk.

When an automatic tracking control and an automatic focus control are to be applied to the recording/reproducing apparatus according to the present invention, a conventional technology shown in FIGS. 1 and 2 may be used.

As already described in detail in the above, according to the present invention, the moving electrode Em is moved sequentially onto a recording track in correspondence to a recording track where a recording process is being performed by the electromagnetic radiation ray flux (laser light flux) P1 containing a recording object information signal incident to the recording head WH. The power source Vw is connected between the transparent electrode Etw in the recording head WH in which the electromagnetic radiation ray flux (laser light flux) P1 containing the recording object information signal enters and an electrode Ed in contact with the moving electrode Em among other electrodes Ed in the electric charge image recording medium D. The power source Vw creates an electric field which causes a discharge only at a recording track where a recording process is being performed by the electromagnetic radiation ray flux (laser light flux) P1 containing the recording object information signal in correspondence to the electromagnetic radiation ray flux (laser light flux) P1 containing the recording object information signal. On the other hand, the recording track interval Tp of the electric charge image recording medium D and the width W of the recording head WH (W is the width of the recording head WH in the direction of the width of a recording track in the electric charge image recording medium) take a relationship of W>Tp. With a conventional recording/reproducing apparatus known in the prior art, if it takes a long time that a region of the electric charge image recording medium, to which the leading end of the recording head WH in the moving direction used to correspond upon beginning of a recording, becomes no longer opposing to the recording head WH, there was a problem as already described, that is, the potential of the photoconductive layer PCE in the recording head WH generally increased because of the occurrence of an electric charge image due to a dark current flowing for a long time, resulting in the deterioration of S/N in a recorded signal. The reason why such a problem occurs is described as follows. The power source Vw gives a voltage between the transparent electrode Etw of the recording head WH arranged opposing to a recording portion in the electric charge image recording medium D and the electrode E of the electric charge image recording medium D. Therefore, an electric field by the power source Vw is always applied across the entire surface of the transparent electrode Etw of the recording head WH and the electric charge image recording medium D. As a result, an electric charge image is created also in a portion of the electric charge image recording medium D, opposing to the portion of the photoconductive layer PCE in the recording head WH where a recording laser light flux is not given, because of long-time dark current. Thus, the potential of the electric charge image recording medium D generally increases while decreasing the S/N ratio of recorded data.

Figure 14:
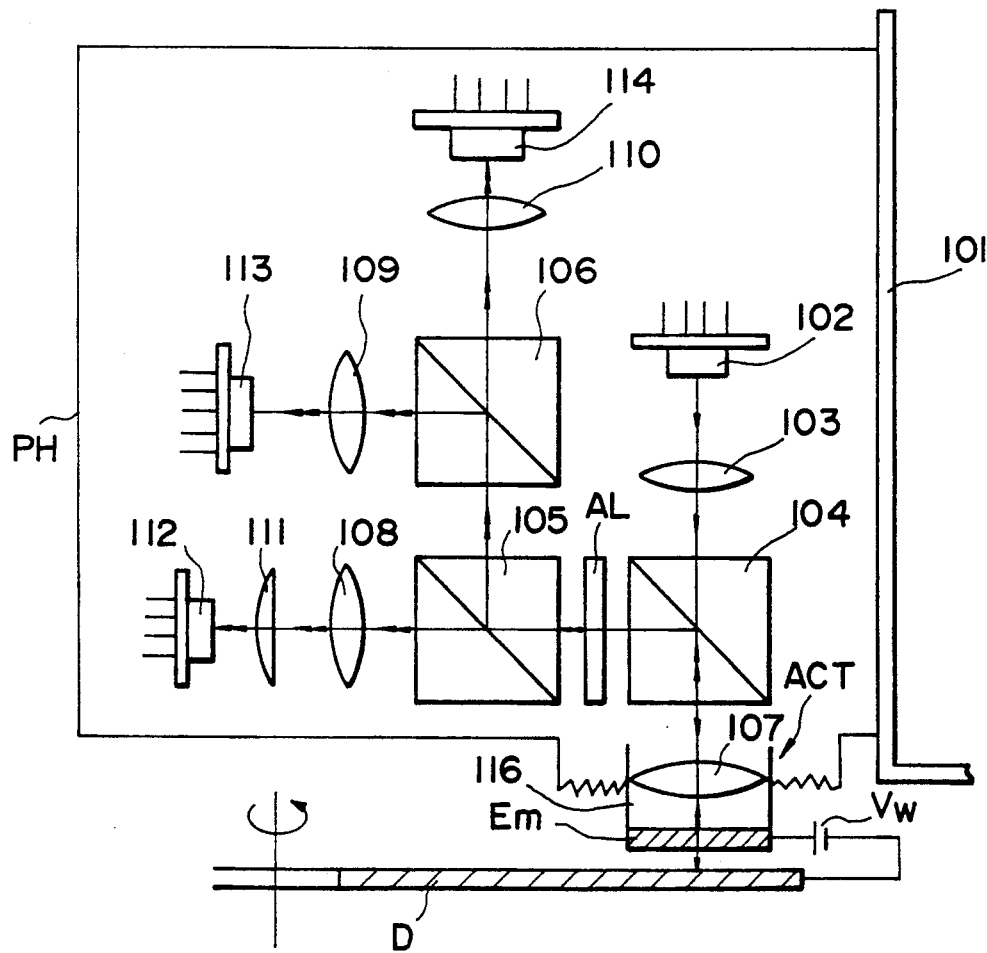
FIG. 14 shows a block diagram of the composition of an electric charge image recording/reproducing apparatus according to the present invention.
Figure 15:
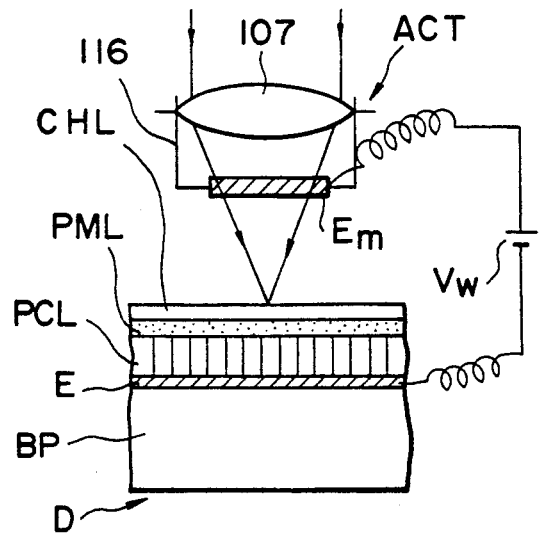
FIG. 15 is a side elevation of denoting a referential composition between an objective lens and a moving electrode.
Figure 16:
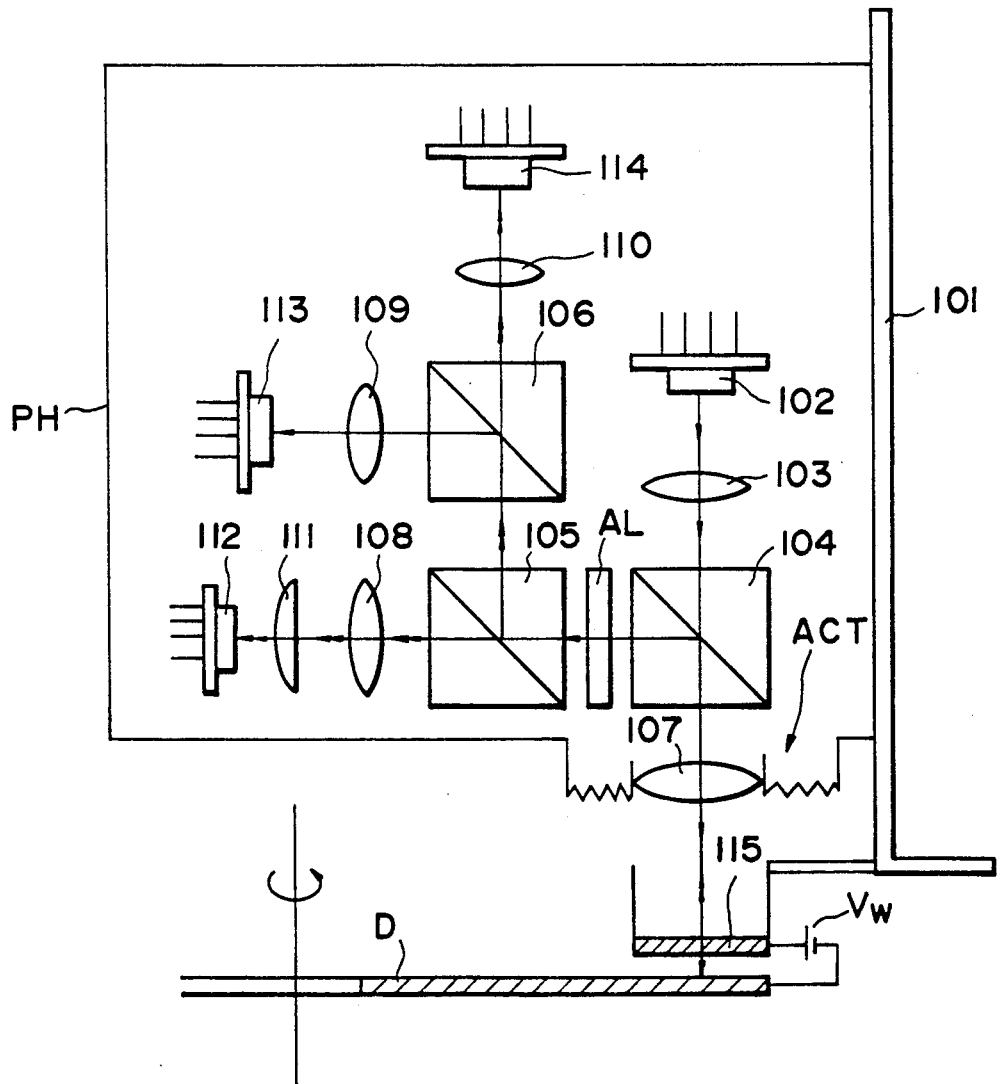
FIGS. 16 and 17 provide block diagrams to show the composition of an electric charge recording/reproducing apparatus on which the present invention is based.
Figure 17:
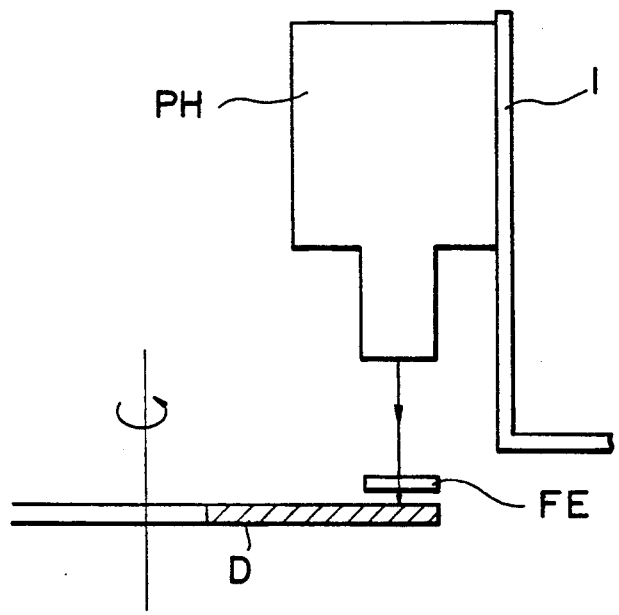
Figure 18:
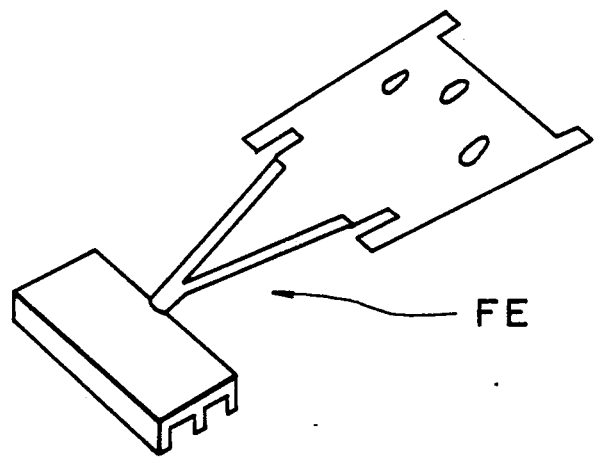
FIG. 18 is a prospective view of a floatation type electrode.

In the electric charge image recording/reproducing apparatus shown in FIG. 14, D represents an electric charge image recording medium disk (electric charge image recording medium) and composed of the same configuration as the electric charge image recording medium D shown in FIG. 15. More explicitly, it comprises an electric charge retention layer member CHL (consisting of such a material as having an extremely high insulation resistance to maintain electric charges adhering thereon for a long time (for example, a silicone resin), an optical modulation material layer PML (a layer composed of for example single crystals of lithium niobate or liquid crystals), a photoconductive layer member PCL and electrodes E which are laminated on a substrate BP.

The electric charge image recording medium D is rotated at a predetermined revolution frequency by a rotary driving mechanism although not illustrated. Referring to FIG. 14, PH represents an optical head which is driven by a carriage 101 in the radial direction of the electric charge image recording medium D (illustrating the detailed configuration of the carriage 101 is omitted).

With the optical head PH shown in FIG. 14, numeral 102 means a semiconductor laser used as an electromagnetic radiation ray source. The semiconductor laser 102 emits a laser light of which the intensity is modulated by a recording object information signal when the electric charge image recording/reproducing apparatus is in a recording mode, while giving the light to a collimator lens 103. When the electric charge image recording/reproducing apparatus is in a reproducing mode, the laser emits a laser light of a predetermined intensity and gives it to the collimator lens 103.

In FIG. 14, numerals 104–106 mean beam splitters with other numerals 107 for an objective lens (condenser lens), 108–110 for lenses, 111 for a cylindrical lens and 112–114 for photoelectric converters.

The objective lens 107 is provided to be driven and displaced in the optical axis direction of the objective lens by an actuator ACT in an automatic focus control system for the optical head PH. A moving electrode Em is integrated onto the objective lens 107 via a connection member 116. A position of the moving electrode Em to be configured integratedly onto the objective lens 107 via the connection member 116 can be determined as follows for example.

First, an objective lens of a microscope is focused at the position of a focal point of the objective lens 107 to which a laser light flux is incident. Next, the position of focusing the microscope is adjusted so that the focal point of the microscope is displaced from the focal point of the objective lens 107 by a predetermined distance along the optical axis of the objective lens towards the lens 107. While keeping the position of the objective lens 107 not changed, only the moving electrode Em is displaced to the focal point of the microscope as adjusted in the above, then the moving electrode Em is fixed onto the connection member 116 at that position.

It is easily understood that the moving electrode Em is positioned at a predetermined distance from the electrode E of the electric charge image recording medium D after completion of positioning the moving electrode Em as described above.

The moving electrode Em is a transparent electrode which maintains transparency to a laser light transmitted through the objective lens 107. When the electric charge image recording/reproducing apparatus is set to a recording mode, the power source Vw is connected between the moving electrode Em and the electrode E of the electric charge image recording medium D, thus an electric field generated between both the electrodes E and Em being applied to the electric charge image recording medium D.

When the electric charge image recording/reproducing apparatus is set to a recording mode, a laser light flux emitted from the semiconductor laser 10 is intensity modulated by a recording object information signal while converted to a parallel beam by the collimator lens 103 and then focused onto the photoconductive layer member PCL in the electric charge image recording medium D after being transmitted through an optical channel of the beam splitter 104→objective lens 107 moving electrode EM →electric charge image recording medium D.

When the electric charge image recording/reproducing apparatus is set to a recording mode, a voltage is given from the power source Vw between the moving electrode Em and the electrode of the electric charge image recording medium D (shown by a symbol E in FIG. 15). Therefore, when a laser light flux intensity-modulated by a recording object information signal as described above is incident to the photoconductive layer PCL, the electric resistance in a portion to which the laser light flux is given in the photoconductive layer PCL decreases while creating a discharge in this portion towards the electric charge retention layer member CHL of the electric charge image recording medium D. Therefore, an electric image corresponding to the recording object information signal is formed on the surface of the electric charge retention layer member CHL in the electric charge image recording medium D.

An operation of reading an electric charge image created in the electric charge retention layer member CHL of the electric charge image recording medium D is carried out as follows. The optical modulation material layer PML in the electric charge image recording medium D, comprising such a material as lithium niobate crystals, changes the plane of polarization of a light transmitted therein according to the effect of an electric field created by the electric charge image formed on the surface of the electric charge retention layer member CHL in the electric charge image recording medium D. Therefore, when the electric charge image recording/reproducing apparatus is set to a reproducing mode, a laser light flux is emitted from the semiconductor laser 102, transmitted through the collimator lens 103 and the beam splitter 104, given to the objective lens 107 and then projected from the objective lens 107 while maintaining a predetermined optical intensity. The laser light flux then goes and returns through the optical modulation material layer PML in the electric charge image recording medium D and again enters the objective lens 107 as a light reflected from the electric charge image recording medium D. This reflected light retains a plane of polarization already changed in correspondence to the electric charge image formed on the surface of the electric charge retention layer member CHL in the electric charge image recording medium D.

The light reflected from the electric charge image recording medium D is reflected by the beam splitter 104 and then converted to a light in the state of altered optical intensity by an analyzer AL, and given to the beam splitter 105 through which the light is transmitted and given to a four-split photoelectric converter 112 via a lens 108 and a cylindrical lens 111. An output signal from the four-split photoelectric converter 112 is modified to a control signal in an automatic focus control system according to an astigmatism method already known in the prior art, and supplied to the actuator ACT of the automatic focus control system.

The actuator ACT of the automatic focus control system may be comprised of a type of which the configuration is already known in the prior art.

In addition, it is also possible to generate a control signal of the automatic tracking control system from an output signal of the four-split photoelectric converter 112 and supply the control signal to the actuator of the automatic tracking control system.

Among light components reflected at the beam splitter 108 and given to the beam splitter 106, an output signal component is transmitted in the beam splitter 106, transmitted through the lens 110, supplied to the photoelectric converter 114 and photoelectrically converted and output from the photoelectric converter 114, as a first component output signal. Among light components reflected by the beam splitter 105 and given to the beam splitter 106, an output signal component is reflected by the beam splitter 106, transmitted through the lens 109, supplied to the photoelectric converter 113 and photoelectrically converted and output from the photoelectric converter 113, as a second output signal component. These first and second output signal components are supplied to a differential circuit, although not illustrated, and used as a detection signal of a high S/N ratio.

According to the electric image recording/reproducing apparatus of the present invention as described above, a laser light flux is converged by the objective lens 107 driven and displaced by the actuator ACT in the automatic focus control system in the optical axis direction. At that time, the laser light flux is always focused on the photoconductive layer member PCL in the electric charge image recording medium D. Therefore, the moving electrode Em configured integratedly with the objective lens 107 is also positioned at a predetermined distance from the point of converging the laser light flux, at any time. Therefore, a distance between the moving electrode Em and the electric charge image recording medium D is maintained constant even if the surface of the electric charge image recording medium D may deflect, thus positioning the electric charge image recording medium D always in the electric field of a predetermined field intensity.

As described in detail in the above, the moving electrode Em in the electric image recording/reproducing apparatus according to the present invention is positioned always at a predetermined distance towards the converging point of a laser light flux condensed by the objective lens 7 driven and displaced by the actuator ACT in the automatic focus control system in the direction of the optical axis. Consequently, a distance between the moving electrode Em and the electric charge image recording medium E is maintained constant even when the surface of the electric charge image recording medium D may deflect while positioning the electric charge image recording medium D in the electric field of a predetermined field intensity, at any time. In addition, according to the present invention, a distance between the electric charge image recording medium and the moving electrode can be set easily in the optical head side. Furthermore, the position of the moving electrode is controlled by the actuator ACT in the automatic focus control system. Therefore, a spacing between the electric charge image recording medium and the moving electrode can be maintained by a system in a simple configuration, in such an order of allowances as measurable only by a micrometer.

FIGS. 19 through 22 are plan views to describe an electric charge image pattern for controlling tracking in the electric charge image recording medium according to the present invention. The electric charge image pattern illustrated in FIGS. 19 through 22 for tracking control are recorded and formed in the electric charge image recording medium D shown in FIG. 23, in the electric charge retention layer member CHL in the electric charge image recording medium D comprising a laminate of a substrate BP, an electrode E, a photoconductive layer member PCL, an optical modulation material layer member PML and an electric charge retention layer member CHL.

Figure 23:
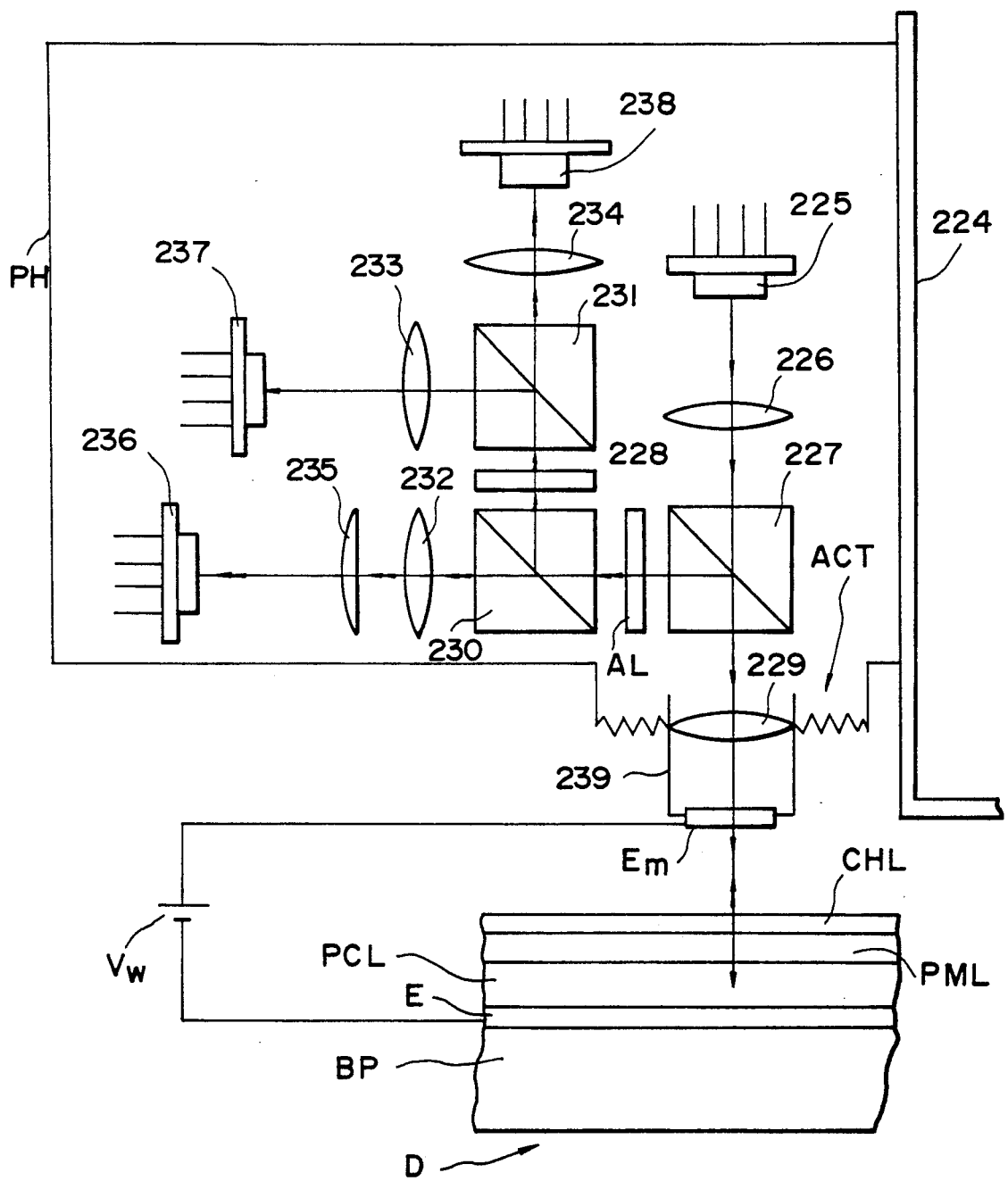
FIG. 23 is a block diagram of indicating an important composition of a recording/reproducing apparatus using the electric charge image recording medium of the present invention.

In the electric charge image recording medium D shown in FIG. 23, the electric charge retention layer member CHL comprises a material having such an extremely high insulation resistance as capable to maintain an electric charge image created therein (for example, a silicone resin). In addition, the photoconductive layer member PCL comprises an electric charge generating layer where electric charges are created by recording electromagnetic radiation rays and an electric charge transmitting layer where electric charges created in the electric charge generating layer are transmitted, the electric charge generating and transmitting layers being laminated together. Or, the optical modulation material layer member PML may comprise for example lithium niobate single crystals or liquid crystals and other optical modulation materials.

FIG. 23 shows an example configuration of the electric charge retention layer member CHL in the electric charge image recording medium D, in which an electric charge image pattern for tracking control shown by a drawing symbol 241 in FIGS. 19 through 22 is created. More explicitly, the electric charge image pattern 41 may also be modified in various ways such as the electric charge image pattern 241 based on a continuous pattern at each position separated by a predetermined recording track interval to adjacent as shown in an example of FIG. 19, an electric charge image pattern 241 based on an intermittent pattern separated by a predetermined recording track interval as shown in an example of FIG. 21, or an electric charge image pattern 241 based on such a zigzag pattern as shown in an example of FIG. 22. These patterns can be created as follows, for example. A mask member provided with any of the predetermined patterns is used to irradiate a light into the electric charge image recording medium via a transparent electrode. In this state, a predetermined voltage is applied to the transparent electrode and the electrode E in the electric charge image recording medium D, thereby creating an electric image pattern for tracking control as shown by the drawing symbol 241 in the electric charge image recording medium D shown in FIG. 19 through 22.

According to another method of creating an electric charge image pattern, in the state of giving a predetermined voltage across the electrode E in the electric charge image recording medium D and the transparent electrode, a laser light which is controlled to scan and describe a predetermined pattern on the electric charge image recording medium is irradiated through the transparent electrode. Thus, an electric charge image pattern for tracking control as shown by the drawing symbol 241 in FIGS. 19 through 22 is easily created on the electric charge image recording medium D.

Figure 22:
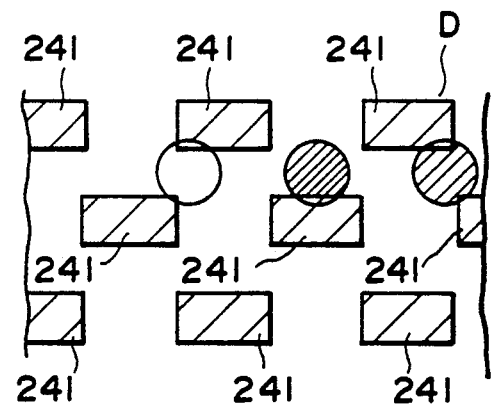
Figure 22C:
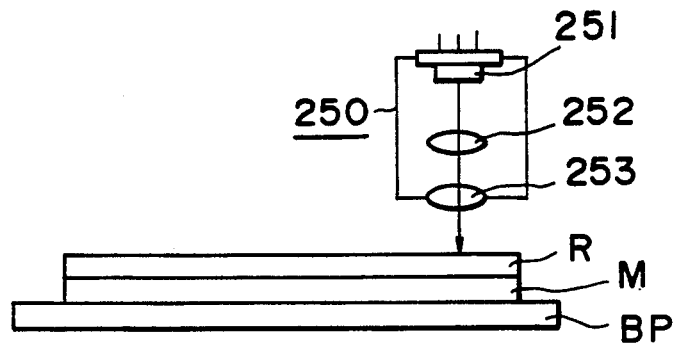
Figure 22B:
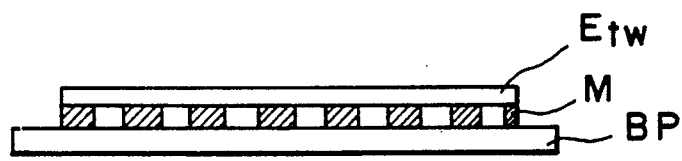
Figure 22A:
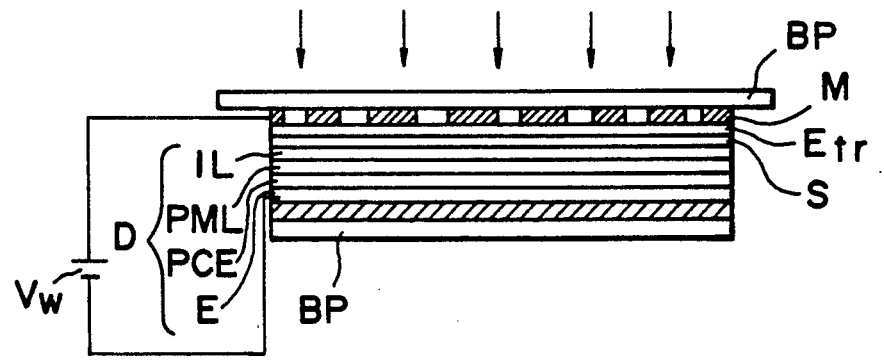

FIG. 22A (a)-(c) shows processes of forming a tracking pattern using a mask. Figures (a), (b) and (c) show a mask creating process, a process of providing a transparent electrode on the mask and a process of recording an optically modulated information signals, respectively. Referring to the Figure (a), a mask member M is deposited on a board BP by sputtering, etc. thus creating a film. The mask member M should preferably be insulative. A photo-resist R is coated on the mask member M on which the output light of a laser 251 is irradiated using a cutting head 250 through a collimator lens 252 and an objective lens 253, onto the photo-resist R. By modulating and scanning the output light of the laser 251, it is possible to create a binary image or multi-graduation image using mesh points, besides tracks.

After completion of exposing, the photo-resist on a non-exposed portion (or exposed portion) is washed off and processed by an etching liquid, thereby leaving only a required portion on the mask member M, as required to create tracks. The mask member M is cleaned to remove unnecessary portions and then coated with a transparent electrode Etw as shown in the Figure (b).

Thus created mask is turned up side down as shown in the figure (c) and placed on a recording medium and exposed. More explicitly, symbol D in the figure represents a recording medium comprising an electric charge retention layer IL, an optical modulation material layer PML, a photoconductive layer PCE, an electrode E and a board BP. A spacer S is set on the medium D, on which the mask is set and exposed.

Next, referring to FIG. 23, the recording/reproducing apparatus of the electric charge image recording medium according to the present invention is described.

The electric charge image recording medium D in FIG. 23 is rotated at a predetermined revolution frequency by a rotary driving mechanism not illustrated.

In FIG. 23, PH represents an optical head which is moved in the radial direction of the electric charge image recording medium D by a carriage 24 (illustrating a detailed configuration of the carriage 24 is omitted). With the optical head PH shown in FIG. 23, numeral 225 represents a semiconductor laser which emits a laser light of which the intensity is modulated by a recording object information signal when the electric charge image recording/reproducing apparatus is set to a recording mode and gives the light to the collimator lens 226. When the electric charge image recording/reproducing apparatus is set to a reproducing mode, the semiconductor laser emits a laser light of a predetermined intensity and gives it to the collimator lens 226. Meaning of numerals in FIG. 23 is 227, 230 and 231 for beam splitters, 228 for a ¼ wave plate, 229 for an objective lens (condenser lens), 232-234 for lenses, 235 for a cylindrical lens, 236 for a 4-split optical detector, and 237 and 238 for photoelectric converters.

The objective lens 229 is provided to be drivable and displacable in the optical axis direction by actuator in the automatic focus control system for the optical head PH. In addition, the objective lens 229 can be driven and displaced in the direction orthogonal to the extension of recording tracks by the actuator in the automatic tracking control system. Each of the actuators in the automatic focus control system and the automatic tracking control system may be composed for example of an already known moving coil type actuator which is controled to drive and displace in 2-axis directions which has been used widely in various apparatuses such as a compact disk player. (ACT in FIG. 23 represents a position of installing an actuator of driving and displacing the objective lens 229, although illustrating the detailed configuration thereof is omitted.)

A moving electrode Em is provided integratedly onto the objective lens 229 through a connection member 239. The position of the moving electrode Em to be configured integratedly onto the objective lens 229 via the connection member 239 can be determined as before described.

Now, detailed operations of tracking control in a recording mode are described as follows.

In the electric charge image recording/reproducing apparatus shown in FIG. 23, an electric charge image pattern for tracking control, as shown in the example of the drawing symbol 41 in FIGS. 19 through 22, is created beforehand in the electric charge image recording medium D used to record a recording object information signal in the form of an electric charge image.

A recording laser light flux of which the intensity is modulated by the recording object information is focused onto the photoconductive layer member PCL in the electric charge image recording medium D by the objective lens 229 as already described. The electrical resistance in the portion to which the laser light flux is given in the photoconductive layer PCL decreases so much as a discharge occurs between the moving electrode Em and the electric charge retention layer member CHL in the electric charge image recording medium D. As a result, an electric charge image is created on the surface of the electric charge retention layer member CHL in the electric charge image recording medium D in correspondence to the recording object information. At the same time, the recording laser light flux reflected by the electrode E enters the beam splitter 227 after being transmitted through an optical path such as the photoconductive layer member PCL→optical modulation material layer member PML→electric charge retention layer member CHL→moving electrode Em→objective lens 229→beam splitter 227. A reflection light from the electric charge image recording medium D is such one as going and returning the optical modulation material layer member PML in the electric charge image recording medium D. The polarization plane thereof is in the state of revolving in correspondence with the intensity of an electric field applied to the photo modulation material layer member PML comprising for example lithium niobate crystals.

In addition, an electric field by an electric charge image pattern is also applied to the optical modulation material layer member PML for tracking control as shown in the example of a drawing symbol 241 in FIGS. 19 through 22, since the image pattern has been created beforehand in the electric charge image recording medium D. Therefore, a light reflected from the electric charge image recording medium D also contains a tracking control information signal already recorded and formed in the electric charge image recording medium D.

The reflection light from the electric charge image recording medium D enters the beam splitter 227 at which the light is reflected, and is transmitted through and output from an analyzer AL. The output light represents a light intensity in correspondence to the amount of polarization plane revolution created when it is transmitted through the optical modulation material layer member PML in the electric charge image recording medium D.

The output light from the analyzer AL enters the beam splitter 230 through which the light is transmitted, and is supplied to the four-split photodetector 236 via the lens 230 and the cylindrical lens 235. However, a light reflected at the beam splitter 230 and incident to the ¼ wave plate 228, when the electric charge image recording/reproducing apparatus is operating in a recording mode, does not contribute to an effective operation of the apparatus.

Figure 24:
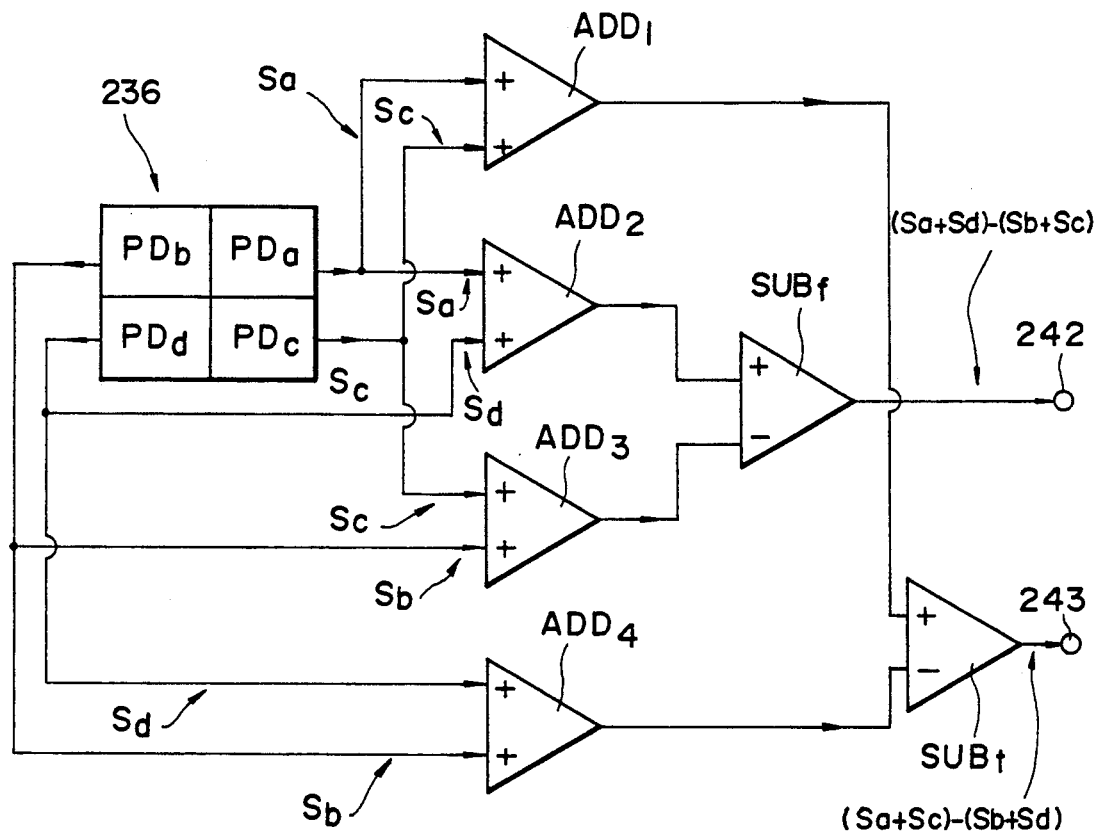
FIGS. 24 and 25 show an important composition of a recording/reproducing apparatus according to the present invention.

The four-split optical detector 36 comprises four photoelectric conversion elements PDa-PDd as shown in the example of FIG. 24. Among output signals Sa-Sd from these four photoelectric conversion elements PDa-PDd in the configuration of the four-split optical detector, the output signal Sa from the photoelectric conversion element PDa and the same Sc from the element PDc are added by the adder ADD1. In addition, among output signals Sa-Sd from four photoelectric conversion elements PDa-PDd in the configuration of the four-split optical detector 36, the output signal Sb from the photoelectric conversion element PDb and the same Sd from the element PDd are added by the adder ADD4.

The output signal (Sa+Sc) from the adder ADD1 and the same (Sb+Sd) from the adder ADD4 are operated in a subtractor SUBt for subtraction to output a tracking control signal of (Sa+Sc)−(Sb+Sd) to the output terminal 243 from the subtractor SUBt. The tracking control signal is phase-compensated in a phase compensation circuit and then supplied to the actuator ACT which drives and displaces the focusing lens 229 in the direction orthogonal to the extension of recording tracks for tracking control. Furthermore, among output signals Sa-Sd from four photoelectric conversion element PDa-PDd in the configuration of the four-split optical detector 236, the output signal Sa from the photoelectric conversion element PDa and the same Sd from the element PDd are added by the adder ADD2. In addition, among output signals Sa-Sd from four photoelectric conversion elements PDa-PDd in the configuration of the four-split optical detector 236, the output signal Sb from the photoelectric conversion element PDb and the same Sc from the element PDc are added by the adder ADD3.

The output signal (Sa+Sd) from the adder ADD2 and the same (Sb+Sc) from the adder ADD3 are operated by the subtractor SUBf for subtraction to output a focus control signal (Sa+Sd)−(Sb+Sc) to the output terminal 242 from the subtractor SUBf. The focus control signal is supplied to the actuator ACT which drives and displaces the focusing lens 229 in the optical axis direction of the focusing lens 229 for focus control.

Figure 19:
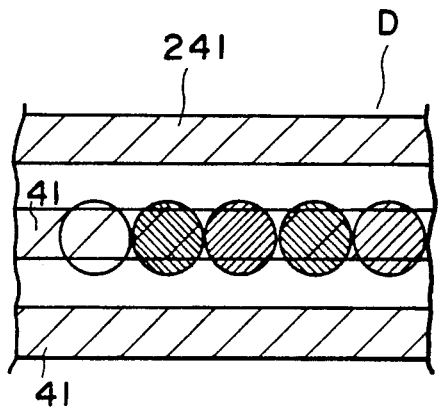
FIGS. 19 through 22C are descriptive views for an electric charge pattern for transistor control in the electric charge image recording medium of the present invention.
Figure 20:
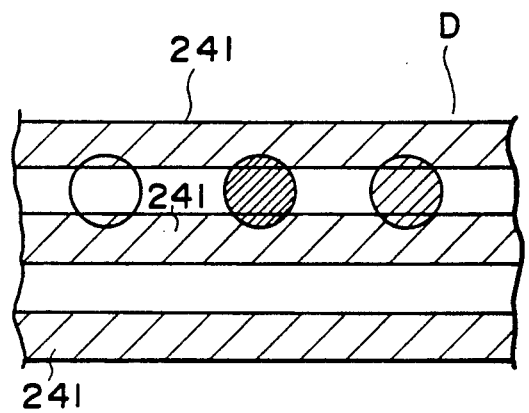

FIGS. 19 and 20 show examples of continuous electric charge image patterns for tracking control as recorded beforehand in the electric charge retention layer member CHL of the electric charge image recording medium D. On the other hand, FIGS. 21 and 22 indicate examples of intermittent such patterns. In any case out of those shown in FIGS. 19 through 22, the tracking control operation performed by reading an electric charge image pattern for tracking control is operable in the same manner.

FIG. 19 shows the example of a tracking control state in which an electric charge image according to a recording object information signal is recorded in superposition to the electric charge image pattern for tracking control as recorded beforehand in the electric charge retention member material CHL of the electric charge image recording medium D.

Figure 21:
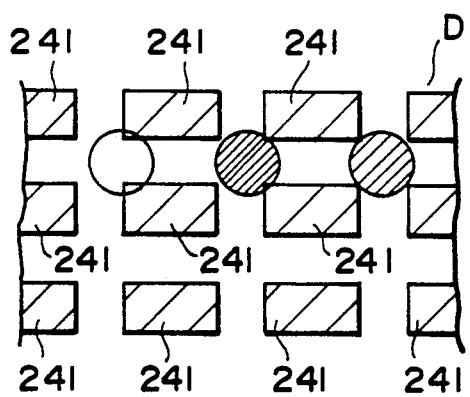

FIGS. 20 through 22 show the example of another tracking control state, in which an electric charge image according to a recording object information signal is recorded in superposition to an intermediate position between adjacent electric charge image patterns for tracking control as recorded and created beforehand in the electric charge retention layer member CHL of the electric charge image recording medium D.

Next, the electric charge image created by the recording object information signal in the electric charge retention layer member CHL of the electric charge image recording medium D by the method described above can be read out by the following operation.

The optical modulation material layer PML in the electric charge image recording medium D comprises for example such a material as lithium niobate crystals and changes the polarization plane of a light transmitted therein by an electric field due to an electric charge image created on the surface of the electric charge retention layer member CHL in the electric charge image recording medium D. Therefore, when the electric charge image recording/reproducing apparatus is set to a reproducing mode and the semiconductor laser 225 emits a laser light flux of a predetermined intensity, the laser light flux is transmitted through the collimator lens 226 and the beam splitter 204, given to the objective lens 229 and then output from the objective lens 229. The laser light flux is transmitted back and forth through the optical modulation material layer PML of the electric charge image recording medium D and then enters the objective lens 229 as a reflection light from the electric charge image recording medium D. The reflection light is in such a state as the polarization plane thereof has been already changed in correspondence to an electric charge image formed on the surface of the electric charge retention layer member CHL in the electric charge image recording medium D. The reflection light from the electric charge image recording medium D is reflected at the beam splitter 227 and the intensity thereof has been changed in the analyzer AL. After that, the reflection light is given to the beam splitter 230 and applied to the four-split photoelectric converter 236 via the lens 232 and the cylindrical lens 235. The output signal from the four-split photoelectric converter 236 is used to generate control signals for the automatic tracking control system and the automatic focus control system as already described referring to FIG. 24, and then supplied to the actuator ACT which activates an automatic tracking control operation and an automatic focus control operation to the focusing lens 229.

Among light components reflected by the beam splitter 230 and then given to the beam splitter 231 via the ½ wave plate 228, a first output signal component is transmitted through the beam splitter 231 and supplied to the photoelectric converter 238 via the lens 234, where the output signal component is photoelectrically converted and output therefrom. Among the optical components reflected by the beam splitter 230 and given to the beam splitter 231, a second output signal component is reflected at the beam splitter 231 and supplied to the photoelectric converter 237 via the lens 233, where the output signal component is photoelectrically converted and output therefrom. The first and second output signal components are then supplied to the subtractor shown in FIG. 25 and output to the output terminal 243 as a reproduced signal.

With the electric charge image recording/reproducing apparatus according to the present invention as shown in FIG. 23, it is possible to facilitate a high-density recording even during an information recording operation onto an electric charge image recording medium, by means of a tracking control operation performed by using an automatic tracking control signal created by reading an electric charge image pattern for tracking control as recorded beforehand in an electric charge retention layer member of the electric charge image recording medium D. Furthermore, a laser light flux is focused into a converging point by the objective lens 229 driven and displaced in the direction of the light axis by means of the actuator ACT in the automatic focus control system. The converging point is located always in the photoconductive layer member PCL in the electric charge image recording medium D. Therefore, the moving electrode Em configured integratedly with the objective lens 229 is located always at a predetermined distance towards the converging point of a laser light flux. Even when the surface of the electric charge image recording medium D may deflect, a distance between the moving electrode Em and the electric charge image recording medium E is maintained constant, thereby making the electric charge image recording medium D positioned at any time in the electric field of a predetermined field intensity.

Since the present invention is configured as described above, a high-density recording can be easily operated in a recording mode, under a tracking control operation. Also, the electric charge image recording medium itself is provided with a photoconductive layer member required in a recording operation and an optical modulation material layer member required in a reading operation. In addition, the recording/reproducing head used in a recording or reproducing operation comprises a moving electrode of a simple configuration. Therefore, it is also easy to have an advantageous recording state no matter how the surface of the electric charge image recording medium may deflect, by making the moving electrode movable integratedly with the focusing lens. Moreover, a pattern for tracking control is recorded and created beforehand in the electric charge image recording medium, by means of an electric charge image. Consequently, compared to a conventional optical disk with a pre-groove, there are much less restrictions in composition materials of a recording medium. It is also possible to use such a recording medium composed as a transparent type.

Figure 27:
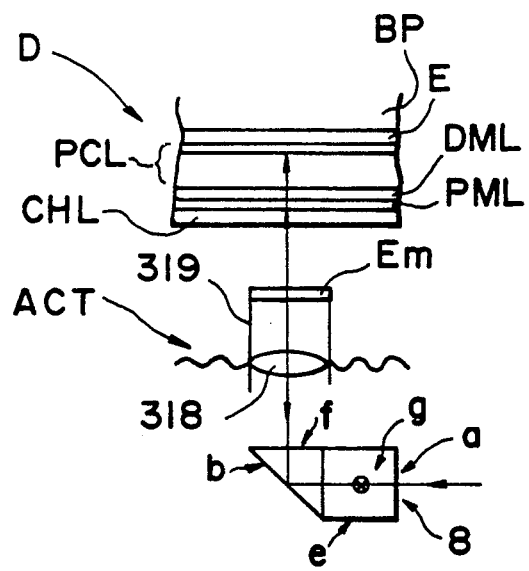
FIG. 27 shows the side view of an important portion for the recording/reproducing apparatus shown in FIG. 26.
Figure 29:
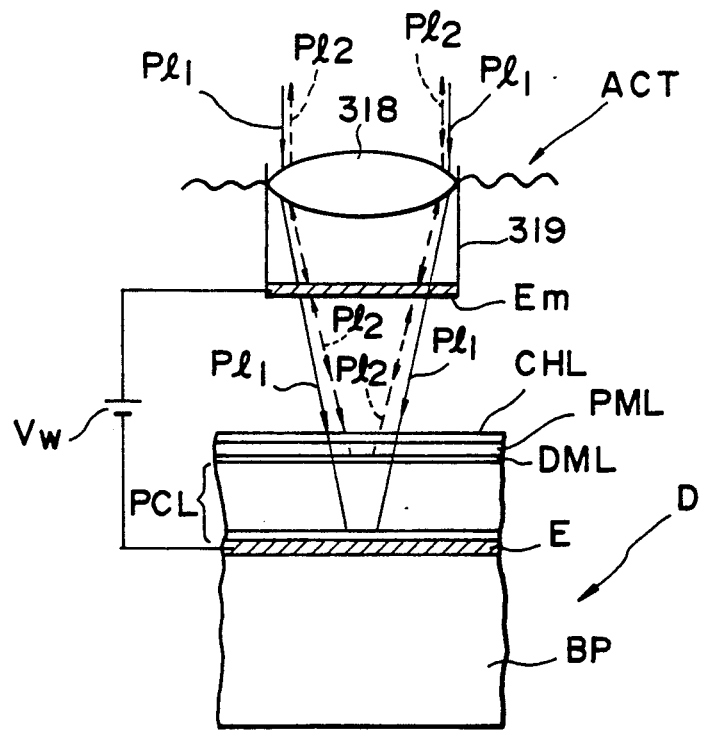
FIGS. 29 and 30 are descriptive views of recording and reproducing operations.

First, referring to FIGS. 27 and 29, D denotes an electric charge image recording medium comprising a laminate of an electrode E, a photoconductive layer member PCL, an optical modulation material layer member PML, a dielectric dichroic mirror DML and an electric charge retention layer member CHL laminated on a substrate BP. Also referring to FIG. 30, D represents an electric charge image recording medium comprising a laminate of a grooved electrode Eg, a photoconductive layer member PCL, an optical modulation material layer member PML, a dielectric dichroic mirror DML and an electric charge retention layer member CHL laminated on a substrate BP.

In the electric charge image recording medium D shown in the foregoing figures, the electric charge retention layer member CHL comprises a material having such an extremely high insulation resistance as capable to retain an electric charge image created thereon for a long time (for example, a silicone resin). The photoconductive layer member PCL in use comprises a laminate of an electric charge generating layer and an electric charge transmission layer using such a material as having a sensitivity to an electromagnetic radiation ray in a first wavelength for recording and not having a sensitivity to an electromagnetic radiation ray in a second wavelength for reproducing. The optical modulation material layer member PML in use may be composed of such an optical modulation material for example as single crystals of lithium niobate or liquid crystals.

The electric charge retention layer member CHL in the electric charge image recording medium D in such a configuration as shown in the examples of FIGS. 27 and 29 may comprise any of the following electric charge image patterns for tracking control; an electric charge image pattern by a continuous pattern at each position separated by a predetermined recording track interval; an electric charge image pattern by an intermittent pattern separated by a predetermined recording track interval; and an electric image pattern by such a pattern as arranged in a zigzag form separated by predetermined recording track intervals. The electric charge image pattern can be easily created by any of the following methods for example; when a light is irradiated onto an electric charge image recording medium through a mask member and a transparent electrode which are provided with the predetermined patterns, a predetermined voltage is applied to the transparent electrode and the electrode E in the electric charge image recording medium D, therefore an electric charge image pattern for tracking control is created in the electric charge image recording medium D; or, when a predetermined voltage is applied across the electrode E of the electric charge image recording medium D and the transparent electrode, an electromagnetic radiation ray which is driven to scan a predetermined pattern on the electric charge image recording medium (hereinafter, an electromagnetic radiation ray is sometimes described as a laser light) is irradiated through the transparent electrode thus creating an electric charge image pattern for tracking control on the electric charge image recording medium D.

Figure 26:
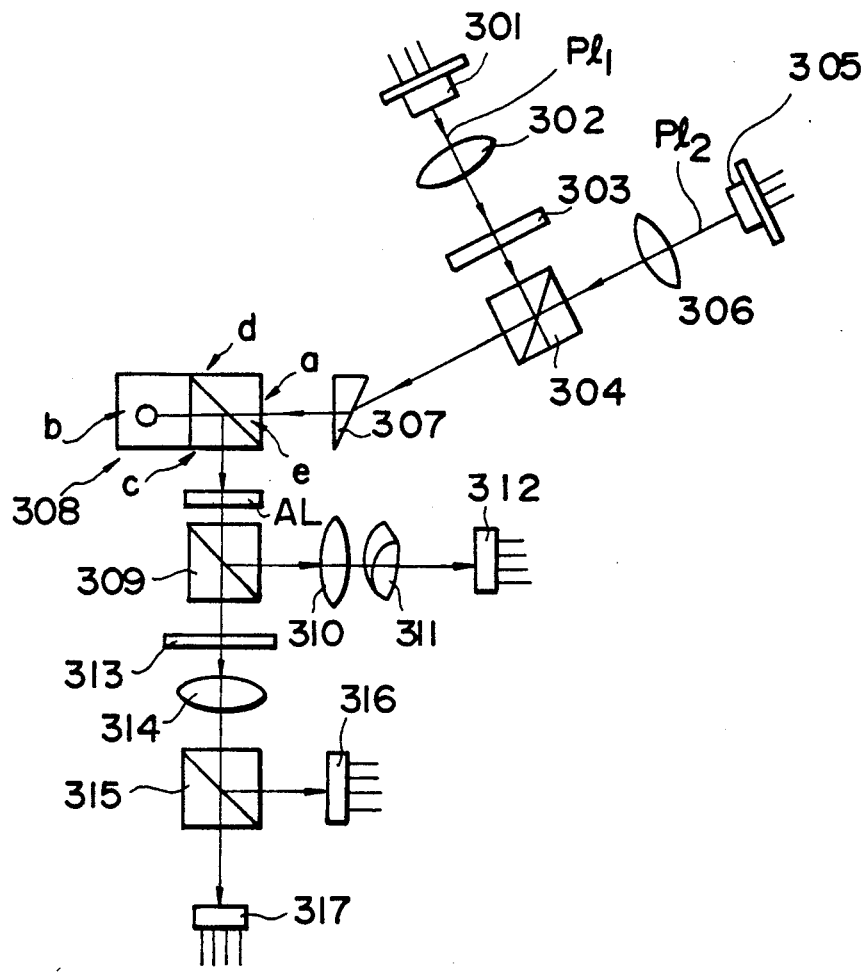
FIG. 26 is a block diagram of illustrating the composition of a recording/reproducing apparatus based on the present invention.

Referring to FIG. 26, numerals 301 and 305 represent semiconductor lasers which emit laser lights of different wavelengths. In the following description, the semiconductor laser 301 is defined to emit a laser light of a first wavelength (for example, 670 nm), while the semiconductor laser 305 being assumed to emit a laser light of a second wavelength (for example, 830 nm). Numerals 302 and 306 represent collimator lenses while numeral 303 denotes a filter which can emit an output laser light after attenuating a laser light entered in the collimator lenses down to a predetermined intensity. Other numerals represent various devices as follows; 304, 309 and 315 for beam splitters, 307 for a prism to compensate a sectional shape of a light beam, 308 for an optical member comprising an example shown in FIG. 28, 310 and 314 for lenses, 311 for a cylindrical lens, 312 for a four-split type optical detector, 313 for a half wavelength plate, 316 and 317 for optical detectors.

Also referring to FIGS. 27 through 30, numeral 18 represents an objective lens, while numeral 319 and symbols ACT and Em indicating a connection member, actuator and a transparent electrode, respectively.

Figure 28:
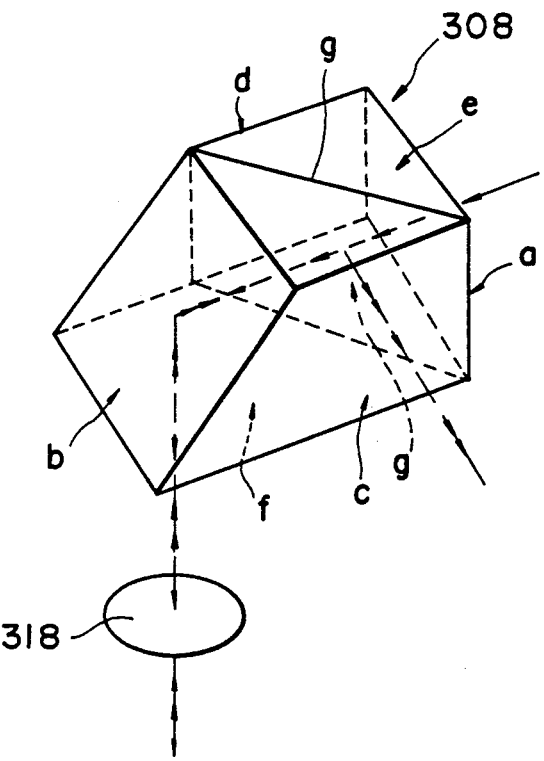
FIG. 28 is a prospective view of optical members used in the recording/reproducing apparatus of FIG. 26.

FIG. 27 is a view of an optical member 8 shown in FIG. 26 (also shown in FIG. 28 in an oblique view) which is rotated around a revolution axis connecting planes a and b in FIG. 26 by an angle of 90°, in order to clearly indicate relationships between the optical member 308 and the objective lens 318, transparent electrode Em, connection member 319 and the electric charge image recording medium D, etc. Each plane of the optical member 308 shown in FIGS. 26 through 28 is symbolized by the same character, any of the drawing symbols a–f, thereby indicating relationships between each figure.

Figure 30:
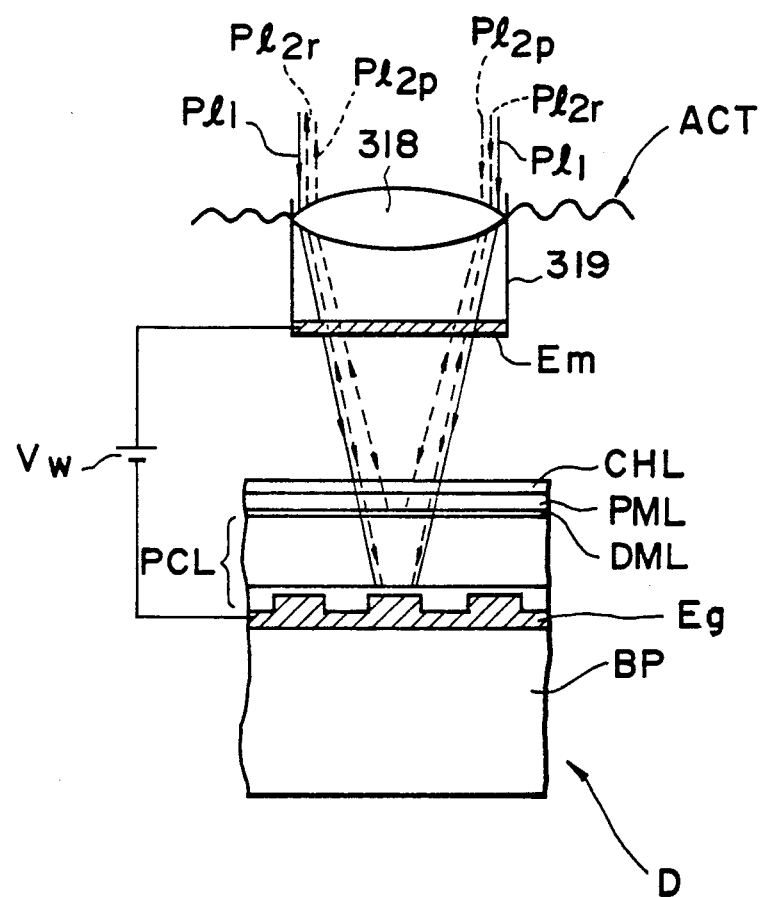

The electric charge image recording/reproducing apparatus shown in FIG. 26 (and FIG. 27) takes a slightly different configuration of component devices depending on whether a recording and reproducing object electric charge image recording medium D is composed into a configuration as shown in the example shown in FIGS. 27 and 29 or the examples shown in FIG. 30. First, it is assumed that the configuration of a recording and reproducing object electric charge image recording medium D is as shown in the example of FIGS. 27 and 29, that is, an electric charge image recording medium D with a planar electrode E is used, while recording and reproducing operations by using an electric charge image pattern recorded in an electric charge retention layer member CHL in the electric charge image recording medium D for tracking control operation, of which detailed functions and operations are described as follows.

Referring to FIG. 29, P11 represents a laser light flux in a first wavelength emitted from the semiconductor laser 301 of FIG. 1 (a wavelength of 670 nm for example). The laser light flux P11 of the first wavelength is converged by the objective lens 318 into a recording laser light flux P11 of which the intensity is modulated by a recording object information signal, while being focused in the electric charge generating layer of the photoconductive layer member PCL in the electric charge image recording medium D. P12 shown in FIG. 29 is a laser light flux of a second wavelength emitted from the semiconductor laser 305 in FIG. 1 (for example, a wavelength of 830 nm). The laser light flux P12 of the second wavelength is focused by the objective lens 318 near a dielectric dichroic mirror DML in the electric charge image recording medium D.

In the electric charge image recording/reproducing apparatus shown in FIG. 26 (including FIG. 27), the laser light flux P11 of the first wavelength (for example, a wavelength of 670 nm) emitted from the semiconductor laser 301 in such a state as the intensity is modulated by a recording object information signal is converted to a parallel light by the collimator lens 302 and then supplied to the filter 303. The filter 303 is a filter used to attenuate the intensity of the laser light flux P11 of the first wavelength down to an intensity suitable for recording signals into the electric charge image recording medium D. The reason why the laser light beam P11 of the first wavelength emitted from the semiconductor laser 301 by the filter 303 is as follows.

The range of intensities of a laser light to be used to record multi-value information in the electric charge image recording medium in order to realize super-high density recording is determined in correspondence to the sensitivity characteristics of the photoconductive layer member used in recording. On the other hand, when multiple values are recorded in the electric charge image recording medium, the semiconductor laser must emit a laser light flux of intensities corresponding to multiple recording levels. It is well known that the minimum intensity of light emitted from a semiconductor laser is limited by its threshold current. For example, the range of intensities of a laser light to be used for multivalue recording information signals in the electric charge image recording medium, in correspondence to the sensitivity characteristics of the photoconductive layer member, is less than 1/1000 of the intensity of the laser light emitted from the semiconductor laser when the semiconductor laser is stably oscillating. Consequently, the laser light flux P11 of the first wavelength emitted from the semiconductor laser 301 is attenuated by the filter 303. The laser light flux P11 emitted from the filter 303 is reflected towards a prism 307 for correcting its profile by a beam splitter 304. The laser light flux P11 for recording, having corrected profile is entered into the surface a or the optical member 308 (see FIG. 28) and reflected on the surface b of the optical member 308 and then entered into the objective lens 318.

The objective lens 318 is configured so as to be driven and displaced in the optical axis direction of the objective lens by the actuator in the automatic focus control system. In addition, it is also provided that the lens 318 can be driven and displaced in the direction orthogonal to the extension of a recording track by the actuator in the automatic tracking control system. The actuators used in the automatic focus control system and the automatic tracking control system may comprise, for example, already known moving coil type actuators which are controllable in two-axis directions for driving and displacing, as widely used according to the prior art in such applications as compact disk players. ACT in FIGS. 26, 29 and 30 shows the position of mounting an actuator of driving and displacing the objective lens 318. However, illustrated description for more practical configuration is omitted therein.

The objective lens 318 is provided integratedly with a moving electrode Em via a connection member 319. The position of the moving electrode Em to be configured integratedly onto the objective lens 318 via the connection member 319 can be determined for example as follows.

Then, position of the moving electrode Em can be set at a predetermined distance from the electrode E of the electric charge image recording medium D.

The moving electrode Em is a transparent electrode the transparency of which is effective to a laser light transmitted through the objective lens 318. When the electric charge image recording/reproducing apparatus is set to a recording mode, a power source Vw is connected between the moving electrode Em and the electrode E of the electric charge image recording medium D, in which an electric field is generated across both the electrodes E and Em and given to the electric charge image recording medium D.

When the electric charge image recording/reproducing apparatus is set to a recording mode, a laser light flux emitted from the semiconductor laser 301 is intensity-modulated according to a recording object information signal, transmitted through the optical path and the objective lens 318 and focused in an electric charge generating layer in the photoconductive layer member PCL of the electric charge image recording medium D.

In such a state as the electric charge image recording-/reproducing apparatus is set to a recording mode, the voltage source Vw gives a voltage between the moving electrode Em and the electrode in the electric charge image recording medium D (as shown by a symbol E in FIG. 29), as described above. Therefore, when a laser light flux of which the intensity is modulated according to a recording object information signal as described above is incident to the photoconductive layer PCL, the electrical resistance in the portion to which the laser light flux is given in the photoconductive layer PCL decreases so much as a discharge occurs at the portion towards the electric charge retention layer member CHL in the electric charge image recording medium D. Thus, an electric charge image in correspondence to the recording object information signal is created on the surface of the electric charge retention layer member CHL in the electric charge image recording medium D.

In a reproducing mode, referring to FIG. 26, a laser light flux P12 of a second wavelength (for example, a wavelength of 830 nm) as emitted from the semiconductor laser 305 is converted to a parallel light into a reproducing laser light flux P12 of a predetermined intensity by the collimator lens 306, transmitted through a beam splitter 304 and entered into a beam section shape correction prism 307 the reproducing laser light flux P12 of which the beam profile has been corrected by the beam section shape correction prism 307 is entered into the surface a of the optical member 308 (see FIG. 28), reflected at the surface b of the optical member 308 and then entered into the objective lens 318.

Then, the reproducing laser light flux P12 enters the electric charge image recording medium D via the moving electrode Em in the state of being converged by the objective lens 318. The reproducing laser light P12 is transmitted through the electric charge retention layer member CHL and the optical modulation material layer member PML in the electric charge image recording medium D and then focused near the dielectric dichroic mirror DML. Next, the reproducing laser light P12 is reflected at the dielectric dichroic mirror DML, transmitted through the optical modulation material layer member PML and the electric charge retention layer member CHL and emitted the electric charge image recording medium D.

The light emitted from the electric charge image recording medium D is a light going and returning in the optical modulation material layer member PML in the electric charge image recording medium D. The polarization plane thereof is in the state of revolving in correspondence to the intensity of an electric field applied to the optical modulation material layer member PML comprising such a material as lithium niobate for example.

Furthermore, an electric field due to an electric charge image pattern recorded and created in the electric charge retention member CHL of the electric charge image recording medium D is also applied to the optical modulation material layer member PML. Therefore, a reflection light from the electric charge image recording medium D includes an information signal for tracking control.

In such a manner as described above, the reflection light of a reproducing laser light flux emitted from the electric charge image recording medium D and entering the objective lens 318 via the moving electrode Em enters the optical member 308 from the surface f of the optical member 308 (see FIG. 28) and then reflected at the surfaces b and g while being emitted from the surface c and entered into the beam splitter 309 via the analyzer AL.

The light entering the beam splitter 309 from the analyzer AL is modulated in such a state as showing a light quantity in correspondence to a revolution quantity of a polarization plane created when the light passes the optical modulation material layer member PML in the electric charge image recording medium D. The light reflected at the beam splitter 309 is supplied to the four-split optical detector 312 via a lens 310 and a cylindrical lens 311. When the electric charge image recording/reproducing apparatus is operated in a recording mode, a light is entered in a half wavelength plate 313 via the beam splitter 309. However, the light does not contribute to the effective operation of the apparatus.

The four-split optical detector 312 comprises an arrangement of four optoelectric conversion elements PDa -PDd as shown in the example of FIG. 24. Among output signals Sa-Sd from four optoelectric conversion elements PDa-PDd configuring the four-split optical detector 312, the output signal Sa from the optoelectric conversion element PDa and the output signal Sc from the optoelectric conversion element PDc are added by the adder ADD1. Also among output signals Sa-Sd from four optoelectric conversion elements PDa-PDd configuring the four-split optical detector 312, the output signal Sb from the optoelectric conversion element PDb and the output signal Sd from the optoelectric conversion element PDd are added by the adder ADD4.

An output signal (Sa+Sc) from the adder ADD1 and an output signal (Sb+Sd) from the adder ADD4 are operated for subtraction by the subtractor SUBt to output a tracking control signal (Sa+Sc)−(Sb+Sd) at the output terminal 321. The tracking control signal is phase-compensated in a phase compensation circuit and then supplied to the actuator ACT which drives and displaces the focusing lens 318 in the direction orthogonal to the extension of a recording track, for tracking control.

In addition, among output signals, Sa–Sd from four optoelectric conversion elements PDa–PDd configuring the four-split optical detector 312, the output signal Sa from the optoelectric conversion element PDa and the output signal Sd from the optoelectric conversion element PDd are added by the adder ADD2. Also among output signals Sa–Sd from four optoelectric conversion elements PDa–PDd configuring the four-split optical detector 312, the output signal Sb from the optoelectric conversion element PDb and the output signal Sc from the optoelectric conversion element PDc are added by the adder ADD3.

An output signal (Sa+Sd) from the adder ADD2 and an output signal (Sb+Sc) from the adder ADD3 are operated for subtraction by the subtractor SUBf which outputs a focus control signal (Sa+Sd)−(Sb+Sc) at the output terminal 320. The focus control signal is supplied to the actuator ACT which drives and displaces the focusing lens 318 in the optical axis direction of the focusing lens 318 for focus control.

Figure 25:
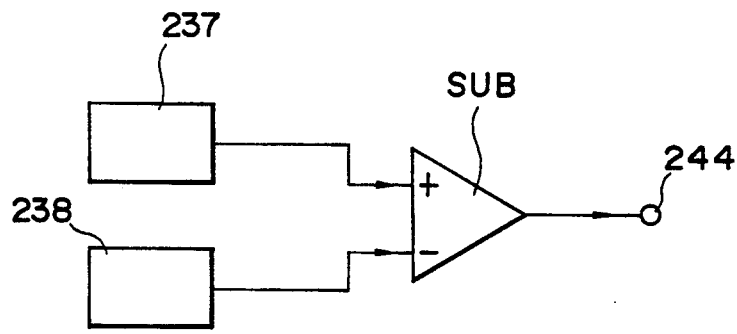

Thus, automatic tracking control and automatic focus control operations are activated to the focusing lens 318. The light given to the beam splitter 315 after being transmitted through the beam splitter 309, ½ wave plate 313 and then the lens 314 contains a first output signal and a second output signal as follows; the first output signal is transmitted through the beam splitter 315 and then supplied to the photoelectric converter 317 where it is photoelectrically converted, and issued from the photoelectric converter 317; and the second output signal component is reflected by the beam splitter 315 and then supplied to the photoelectric converter 316 where it is photoelectrically converted, and issued from the photoelectric converter 316. The first and second output signal components are supplied to such a subtractor (a differential circuit) SUB as shown in FIG. 25 from which a reproducing signal of a satisfactory S/N ratio is outputted to the output terminal 321.

As described above, the electric charge image recording/reproducing apparatus uses a recording laser light flux P11 and a reproducing (reading a recording information signal, reading a tracking control information signal and reading a focus control information signal) laser light flux P12; the laser light fluxes P11 and P12 being in the first and second wavelengths, respectively. Meanwhile, positions of focusing the laser light fluxes P11 and P12 by the objective lens 318 must be separated by a distance substantially equal to the thickness of the photoconductive layer member PCL in the electric charge image recording medium D as shown in FIG. 29. However, such a predetermined distance can be easily achieved by adjusting the positions of the semiconductor lasers 301 and 305.

Next, when the composition of a recording and reproducing object electric charge image recording medium D is as shown in the example of FIG. 30 in which such an electric charge image recording medium D as having a grooved electrode Eg in use while performing recording and reproducing operations using a reflection type grooved electrode Eg in the electric charge image recording medium D for tracking control operation. The operation of such an electric charge image recording/reproducing apparatus as described above is explained in the following.

P11 shown in FIG. 30 is a laser light flux in a first wavelength (for example, a wavelength of 670 nm) emitted from the semiconductor laser 301 in FIG. 26. The laser light flux P11 of the first wavelength is converged into a recording laser light flux P11 of which the intensity is modulated by a recording object information signal, by the objective lens 318 while being focused in the electric charge generating layer of the photoconductive layer member PCL in the electric charge image recording medium D.

Referring to FIG. 30 P12r is a laser light flux of a second wavelength (for example, a wavelength of 830 nm) emitted from the semiconductor laser 305 in FIG. 26, during a recording mode. The laser light flux P12r of the second wavelength in a recording mode is converged into a reproducing laser light flux P12r of a predetermined intensity, by the objective lens 318 while being focused onto a grooved electrode Eg in the electric charge image recording medium D. Furthermore, referring to FIG. 30, P12p represents a laser light flux of a second wavelength (for example, a wavelength of 830 nm) emitted from the semiconductor laser 305 in FIG. 26 during a reproducing mode. The laser light flux P12p of the second wavelength in a reproducing mode is converged into a reproducing laser light flux P12p of a predetermined intensity, by the objective lens 318 while being focused near the dielectric dichroic mirror DML in the electric charge image recording medium D.

In the electric charge recording/reproducing apparatus shown in FIG. 26 (including FIG. 27), the semiconductor laser 301 emits a laser light flux P11 of a first wavelength (for example, a wavelength of 670 nm) in the state of being intensity-modulated by a recording object information signal which is converted to a parallel light by the collimator lens 302 and then supplied to the filter 303, thereby the intensity of the laser light flux P11 of the first wavelength being attenuated to such an intensity as suitable to record in the electric charge image recording medium D.

The recording laser light flux P11 emitted from the filter 303 is reflected by the beam splitter 304 towards a beam section shape correction prism 307 which compensates a beam section shape. Thus compensated recording laser light flux P11 enters the surface a of the optical member 308 (see FIG. 28), is reflected by the surface b of the optical member 308 and entered into the objective lens 318.

The objective lens 318 is configured so as to be drivable and displaceable towards the optical axis direction of the objective lens by the actuator in the automatic focus control system. In addition, the lens 318 is also made drivable and displaceable in the direction orthogonal to the extension of a recording track by the actuator in the automatic tracking control system.

When the electric charge image recording/reproducing apparatus is set to a recording mode, the power source Vw is connected between the moving electrode Em and the electrode E in the electric charge image recording medium D, thus an electric field generated across both the electrodes E and Em is given to the electric charge image recording medium D.

A laser light flux, emitted from the semiconductor laser 1 when the electric charge image recording/reproducing apparatus is set to a recording mode, is intensity-modulated by a recording object information signal, transmitted through the optical path and focused onto the electric charge generating layer in the photoelectric layer member PCL in the electric charge image recording medium D by the objective lens 318.

When the electric charge image recording/reproducing apparatus is set to a recording mode, a voltage is applied from the power source Vw between the moving electrode Em and the grooved electrode Eg of the electric charge image recording medium D as described before. Therefore, when the laser light flux of which the intensity is modulated by the recording object information signal is entered into the photoconductive layer PCL, the electric resistance at a portion of the photoconductive layer PCL where the laser light flux is given decreases so much as a discharge occurs at that portion towards the electric charge retention layer member CHL in the electric charge image recording medium D, whereby an electric image is created on the surface of the electric charge retention layer member CHL in the electric charge image recording medium D in correspondence to the recording object information signal.

On the other hand, a laser light flux P12r of a second wavelength (for example a wavelength of 830 nm) is emitted from the semiconductor laser 305 in a recording mode as shown in FIG. 26. Being as a reproducing laser light flux P12r (a laser light flux to reproduce tracking control information signal and focus control information signal), the laser flux P12r is converted to a parallel light by the collimator lens 306, transmitted through the beam splitter 304 and entered in the beam section shape correction prism 307. The reproducing laser light flux P12r, of which the beam section shape has been corrected by the beam section shape correction prism 307, is entered into the surface a of the optical member 308 (see FIG. 28), reflected at the surface b of the optical member 308 and then entered into the objective lens 318.

Also, the reproducing laser light flux P12r in the recording mode is entered into the electric charge image recording medium D via the moving electrode Em in a state of being converged by the objective lens 318. The reproducing laser light P12r in the recording mode is transmitted through the electric charge retention layer member CHL and the optical modulation material layer member PML in the electric charge image recording medium D and focused near the grooved electrode Eg. Next, the reproducing laser light P12r in the recording mode is reflected by the grooved electrode Eg, transmitted through the optical modulation material layer member PML and the electric charge retention layer member CHL and leaves the electric charge image recording medium D. The light emitted from the electric charge image recording medium D is in such a state that the optical intensity thereof is changed according to a relative positional relationship between an optical spot by the reproducing laser light P12r in the recording mode, as entered into the electric charge image recording medium D and the grooved electrode Eg. A reflection light from the electric charge image recording medium D also include information for tracking control and focus control.

The reflection light of the reproducing laser light flux P12r in the recording mode, emitted from the electric charge image recording medium D and entered into the objective lens 318 via the moving electrode Em as described above, is entered into the optical member 308 from the surface f of the optical member 308 (see FIG. 28) and then reflected at surfaces b and g while being outputted from the surface c and entered into the beam splitter 308 via the analyzer AL. The light entered into the beam splitter 309 as described above is reflected at the beam splitter 309 and supplied to the four-split optical detector 312 via the lens 10 and the cylindrical lens 311. Control signals for the automatic tracking control system and the automatic focus control system are generated from an output signal of the four-split optical detector 312 as already described referring to FIG. 24, and supplied to the actuator ACT which performs automatic tracking and focus control operations to the focusing lens 318. At that time, a light entered into the half wavelength plate 313 transmitted through the beam splitter 309 when the electric charge image recording/reproducing apparatus is operating in a recording mode does not contribute to the effective operation of the apparatus.

Next, a case where the electric charge image recording/reproducing apparatus is set to a reproducing mode is explained in the following. When the electric charge image recording/reproducing apparatus is set to a reproducing mode, emitting of a laser light flux from the semiconductor laser 301 shown in FIG. 26 is stopped. In addition, a laser light flux P12p of a second wavelength (for example, a wavelength of 830 nm) emitted from the semiconductor laser 305 of FIG. 26 is converted to a parallel light by the collimator lens 306 as a reproducing laser light flux P12p of a predetermined intensity, then transmitted through the beam splitter 304 and entered into the beam section shape correction prism 307. The reproducing laser light flux P12p of which the beam section shape has been corrected by the beam section shape correction prism 307 is entered into the surface a of the optical member 308 (see FIG. 28), reflected at the surface b of the optical member 308 and then entered into the objective lens 318. The reproducing laser light flux 612p is then entered into the electric charge image recording medium D via the moving electrode Em in a state of being converged by the objective lens 318, transmitted through the electric charge retention layer member CHL and the optical modulation material layer member PML in the electric charge image recording medium D, and focused near the dielectric dichroic mirror DML. Next, the reproducing laser light flux P12p is reflected at the dielectric dichroic mirror DML and leaves the electric charge image recording medium D after being transmitted through the optical modulation material layer member PML and the electric charge retention layer member CHL.

According to the foregoing description, it is obviously required that, among reproducing laser light beam components emitted from the semiconductor laser 305 as shown in FIG. 26, the reproducing laser light flux P12r when the electric charge image recording/reproducing apparatus is set to a recording mode is converged into a reflection type electrode Eg in the electric charge image recording medium D, while the reproducing laser light flux P12p when the electric charge image recording/reproducing apparatus is set to a reproducing mode is converged near the dielectric dichroic mirror DML. Therefore, with the electric charge image recording/reproducing apparatus, the positions of the reproducing laser light flux must be switchable in the recording or reproducing mode as described above. However, such a switching operation of the converging positions of the reproducing laser light flux can be easily performed by any of the following methods; according to an example, the position of the semiconductor laser 305 is changed to make the positions of converging the reproducing laser light flux are switchable in a recording mode and a reproducing mode or, for another example, an optical element is mounted or removed in the optical path of the reproducing light in a recording or reproducing mode to make the positions of converging the reproducing laser light flux, as already known in the prior art as technical means. The light emitted from the electric charge image recording medium D is a light transmitted back and forth in the optical modulation material layer member PML in the electric charge image recording medium D, of which the polarization plane is maintained in state of revolving in correspondence to the intensity of an electric field applied to the optical modulation material layer member PML comprising such a material as lithium niobate crystals for example. Meanwhile, an electric field by an electric charge image pattern recorded and created in the electric charge retention layer member CHL of the electric charge image recording medium D is also applied to the optical modulation material layer member PML. Therefore, a reflection light from the electric charge image recording medium D includes information recorded in the electric charge retention layer member CHL, an information signal for tracking control and an information signal for focus control. Therefore, when the laser light flux having a predetermined optical intensity as emitted from the objective lens 318 is entered again into the objective lens 318 as a reflection light from the electric charge image recording medium D after being transmitted back and forth through the optical modulation material layer PML in the electric charge image recording medium D, the polarization plane of the reflection light has been changed in correspondence to an electric charge image created on the surface of the electric charge retention layer member CHL in the electric charge image recording medium D.

The reflection light from the electric charge image recording medium D is reflected by the optical member 308 and then converted to a light in such a state as the optical intensity thereof is changed by the analyzer AL. Next, the light is given to the beam splitter 309 at which the light is reflected. The reflection light is given to the four-split photoelectric converter 312 via the lens 310 and the cylindrical lens 311. From an output signal of the four-split photoelectric converter 312, control signals for the automatic tracking control system and the automatic focus control system are generated as already described referring to FIG. 2 and supplied to the actuator ACT which performs an automatic tracking control operation and an automatic focus control operation to the objective lens 318.

Among components of the light transmitted through the beam splitter 309, half wavelength plate 313 and then the lens 314 and given to the beam splitter 315, an output signal component is transmitted through the beam splitter 315 and then supplied to the photoelectric converter 317 in which the output signal component is photoelectrically converted, and issued from the photoelectric converter 317. Among the light components given to the beam splitter 315, a second output signal component is reflected at the beam splitter 315 and then supplied to the photoelectric converter 316 in which the second output signal component is photoelectrically converted, and issued from the photoelectric converter 316. The first and second output signal components are supplied to such a subtractor (differential circuit) SUB as shown in FIG. 25, from which a reproducing signal of a satisfactory S/N ratio is issued to the output terminal 321.

Referring to FIG. 26, the semiconductor laser 301 emits a laser light flux P11 of a first wavelength, while the semiconductor laser 305 in FIG. 26 emitting laser light fluxes P12$r$ and P12$p$ of a second wavelength.

Using the laser light fluxes P11, P12$r$ and P12$p$ and the electric charge image recording medium D shown in FIG. 30, recording and reproducing operations are performed as described above in the following preferred conditions; the photoconductive layer member PCL in the electric charge image recording medium D comprises such a structure material as having a sensitivity to the laser light flux P11 of the first wavelength emitted from the semiconductor laser 301 for recording and not having a sensitivity to the laser light fluxes P12$r$ and P12$p$ of the second wavelength emitted from the semiconductor laser 305 for reproducing; and the dielectric dichroic mirror DML in the electric charge image recording medium D has a transparency larger than 90% to the laser light flux P11 of the first wavelength for recording and a transparency of about 50% to the laser light fluxes P12$r$ and P12$p$ of the second wavelength for reproducing.

Referring to FIG. 30 in which a recording and reproducing object electric charge image recording medium D comprises an electrode Eg of a grooved reflection type while using the reflection type grooved electrode Eg for tracking control operation to perform recording and reproducing operations, the configuration of the electric charge image recording/reproducing apparatus was as follows; in a recording mode, the laser light flux P11 of the first wavelength used for recording information in a recording mode and the laser light flux P12$r$ of the second wavelength used as a laser light flux for tracking control and focus control in a recording mode are converged into the electrode Eg of the electric charge image recording medium D; and, in a reproducing mode, the laser light flux P11 of the first wavelength is not used while converging the laser light flux P12$p$ of the second wavelength near the dielectric dichroic mirror DML in the electric charge image recording medium D. However, it is also possible to modify the electric charge image recording/reproducing apparatus in such a manner that, in a reproducing mode, the laser light flux P11 of the first wavelength is used for detecting a tracking control information signal and a focus control information signal while converging the laser light flux P12$p$ of the second wavelength near the dielectric dichroic mirror DML in the electric charge image recording medium D to be available for reproducing an information signal recorded in the electric charge image recording medium. Such a modified electric charge image recording/reproducing apparatus can be operated as follows.

More explicitly, in order that the laser light flux P11 of the first wavelength can be used for detecting a tracking control information signal and a focus control information signal in a reproducing mode as described above, the filter 303 shown in FIG. 26 is configured so that it is removed out of the optical path of the laser light flux P11 of the first wavelength in a reproducing mode; the laser light flux P11 of the first wavelength can be returned to a reproducing system as a reflection light having a satisfactory optical intensity from the reflection type grooved electrode Eg in a reproducing mode thereby making a tracking control information signal and a focus control information signal detectable; and the beam splitter 309 is made a dichroic mirror to prevent the laser light flux P11 of the first wavelength from entering the beam splitter 315 in a reproducing mode. However, it is the same as the configuration example that converging positions of the reproducing laser light are made switchable in a recording mode and a reproducing mode.

Obvious from the foregoing detailed description, the electric charge image recording/reproducing apparatus according to the present invention can perform such a multi-value recording as allowing a high-density recording using two laser light fluxes from two semiconductor lasers in different wavelengths under a tracking control using a recording surface.

We claim:

1. An electric charge image recording/reproducing apparatus comprising:

an electric charge image recording medium (D) composed of a laminate of a first electrode (E), a photoconductive layer member (PCL), a dielectric dichroic mirror, an optical modulation layer member (PML) and an electric charge retention layer member (CHL);

a movable electrode (Em) and an objective lens (318) located at a respective predetermined distance from said first electrode in the medium (D);

first means to focus a first electromagnetic radiation ray flux containing a recording object information signal in a recording mode onto the photoconductive layer member (PCL), thereby forming an electric charge image by a discharge occurring between said movable electrode (Em) and the electric charge image recording medium (D) in correspondence to the intensity distribution of an electric field created between said first electrode (E) of said electric charge image recording medium (D) and said movable electrode (Em) according to said recording object information signal, onto said electric charge retention layer (CHL) in said electric charge recording medium (D);

second means to focus a second electromagnetic radiation ray flux in a wavelength different from that of said first electromagnetic radiation ray flux, using said objective lens (318), onto a portion near said dichroic mirror in said electric charge image recording medium (D);

third means to pass said second electromagnetic radiation ray flux reflected from said electric charge image recording medium (D) in such status as the state of polarization is changed by an electric field due to an electric charge retention layer (CHL) in said electric charge image recording medium (D), onto a reproducing optical system via said objective lens (318); and fourth means to obtain a reproduced signal, a tracking control signal and a focus control signal by photoelectrically converting a light from said reproducing optical system.

2. The electric charge image recording medium of claim 1, wherein the first electromagnetic radiation ray flux of which the intensity has been modulated by a recording object information signal is given to the electric charge image recording medium after being attenuated by a filter.

3. An electric charge image recording/reproducing apparatus comprising:

an electric charge image recording medium (D) composed of a laminate of such a reflection type electrode (E) as indicating a tracking control information signal according to the change of a geometrical shape, a photoconductive layer member (PCL), a dielectric dichroic mirror, an optical modulation material layer member (PML) and an electric charge retention layer member (CHL);

a movable electrode (Em) and an objective lens (318) provided to be positioned at a respective predetermined distance from said electrode in said medium (D);

first means to focus a first electromagnetic radiation ray flux including a recording object information signal onto said photoconductive layer member (PCL) in a recording mode, thereby creating an electric charge image due to a recording object information onto said electric charge retention layer (CHL) in said electric charge image recording medium (D) by a discharge occurring between said movable electrode (Em) and said electric charge image recording medium (D) in correspondence to the distribution of intensities of an electric field generated between said electrode (E) in said electric charge image recording medium (D) and said movable electrode (Em);

second means to alternately switch the position of focusing a second electromagnetic radiation ray flux in a wavelength different from that of said first electromagnetic radiation ray flux, onto a proximity of said reflection type electrode or said dielectric dichroic mirror in a recording or a reproducing mode respectively;

third means to pass said second electromagnetic radiation ray flux, reflected from said reflection type electrode in said electric charge image recording medium in a recording mode, onto a reproducing optical system via said objective lens while obtaining a tracking control signal and a focus control signal by photoelectrically converting a light from said reproducing optical system;

fourth means to pass said second electromagnetic radiation ray flux reflected from said reflection type electrode in said electric charge image recording medium in a recording mode onto said reproducing optical system via said objective lens while obtaining a tracking control signal and a focus control signal by photoelectrically converting a light from said reproducing optical system; and fifth means to pass said second electromagnetic radiation ray flux reflected from said electric charge image recording medium in such status as the state of polarization is changed in correspondence to an electric field due to an electric image pattern formed in said electric charge retention layer (CHL) in a reproducing mode, onto said reproducing optical system via said objective lens (318), while obtaining a reproduced signal, a tracking signal and a focus control signal.

4. An electric charge image recording/reproducing apparatus comprising:

an electric charge image recording medium (D) composed of a laminate of such a reflection type electrode as indicating a tracking control information signal by the change of a geometrical shape, a photoconductive layer member (PCL), a dielectric dichroic mirror, an optical modulation material layer member (PML) and an electric charge retention layer member (CHL);

a movable electrode (Em) and an objective lens (318) provided to be positioned at a respective distance from said electrode (E) in said medium (D);

first means to focus a first electromagnetic radiation ray flux containing a recording object information signal in a recording mode onto the photoconductive layer member (PCL) in the electric charge recording medium (D) by said objective lens (318) while creating an electric charge image according to said recording object information signal by a discharge occurring between electric charge recording medium (D) and said movable electrode (Em) in correspondence to the distribution of intensities of an electric field generated between said electrode (E) in said electric charge image recording medium (D) and said movable electrode (Em);

second means to focus a second electromagnetic radiation ray flux in a wavelength different from that of said first electromagnetic radiation ray flux onto a proximity of said reflection type electrode or said dielectric dichroic mirror in a freely switchable manner;

third mean to pass said second electromagnetic radiation ray flux from said reflection type electrode in said electric charge image recording medium (D) in a recording mode onto a reproducing optical system via said objective lens (318), while obtaining a tracking control signal and a focus control signal by photoelectrically converting a light from said reproducing optical system;

fourth means to pass said second electromagnetic radiation ray flux reflected from said reflection type electrode in said electric charge image recording medium in a reproducing mode onto said reproducing optical system via said objective lens (318) while obtaining a tracking control signal and a focus control signal by photoelectrically converting a light from said reproducing optical system; and fifth means to pass said second electromagnetic radiation ray flux reflected from said electric charge image recording medium (D) in such status as the state of polarization is changing in correspondence to an electric field due to an electric image pattern formed in said electric charge retention layer (CHL) in a reproducing mode, onto said reproducing optical system via said objective lens (318).

* * * * *